(12) United States Patent
Anthony et al.

(10) Patent No.: US 12,357,118 B2
(45) Date of Patent: *Jul. 15, 2025

(54) HYBRID RECEPTACLE BEVERAGE BREWING SYSTEM

(71) Applicant: SharkNinja Operating LLC, Needham, MA (US)

(72) Inventors: Joshua D. Anthony, Billerica, MA (US); Steven Carter, London (GB); Andrew John Roy Tattersfield, London (GB); Michael James Douglas, London (GB); Ethan T. Brown, Cambridge, MA (US); Lynas Francis, Needham, MA (US)

(73) Assignee: SharkNinja Operating LLC, Needham, MA (US)

( * ) Notice: Subject to any disclaimer, the term of this patent is extended or adjusted under 35 U.S.C. 154(b) by 796 days.

This patent is subject to a terminal disclaimer.

(21) Appl. No.: 17/567,517

(22) Filed: Jan. 3, 2022

(65) Prior Publication Data

US 2022/0202229 A1   Jun. 30, 2022

Related U.S. Application Data

(60) Division of application No. 17/139,488, filed on Dec. 31, 2020, now Pat. No. 11,246,446, which is a
(Continued)

(51) Int. Cl.
*A47J 31/06* (2006.01)
*A47J 31/10* (2006.01)
(Continued)

(52) U.S. Cl.
CPC ....... *A47J 31/0668* (2013.01); *A47J 31/0663* (2013.01); *A47J 31/0684* (2013.01);
(Continued)

(58) Field of Classification Search
None
See application file for complete search history.

(56) References Cited

U.S. PATENT DOCUMENTS 648,858 A    5/1900 Dolge
1,147,408 A    7/1915 Kells
(Continued)

FOREIGN PATENT DOCUMENTS

CA    2645632 A1    10/2007
CA    2716610 A1    9/2009
(Continued)

OTHER PUBLICATIONS

U.S. Appl. No. 17/139,488, filed Dec. 31, 2020, Hybrid Receptacle Beverage Brewing System.
(Continued)

*Primary Examiner* — John J Norton
(74) *Attorney, Agent, or Firm* — Mintz, Levin, Cohn, Ferris, Glovsky and Popeo, P.C.

(57) ABSTRACT

A system for preparing a brewed beverage from at least one flavorant includes a housing, a receptacle connectable to the housing for holding the at least one flavorant and a reservoir connectable to the housing. The receptacle including a first fluid inlet and a second fluid inlet and a first fluid flow path fluidly connects the reservoir to the first fluid inlet and a second fluid flow path fluidly connects the reservoir to the second fluid inlet.

20 Claims, 27 Drawing Sheets

Related U.S. Application Data continuation of application No. 17/138,575, filed on Dec. 30, 2020, now Pat. No. 12,171,361.

(51) Int. Cl.
 *A47J 31/36* (2006.01)
 *A47J 31/46* (2006.01)

(52) U.S. Cl.
 CPC ........... *A47J 31/10* (2013.01); *A47J 31/3671* (2013.01); *A47J 31/3676* (2013.01); *A47J 31/461* (2018.08)

(56) References Cited

U.S. PATENT DOCUMENTS

| | | | |
|---|---|---|---|
| 1,333,745 | A | 3/1920 | Burton |
| 2,589,783 | A | 3/1952 | Crossley et al. |
| 2,634,726 | A | 4/1953 | Hanson |
| 2,746,455 | A | 5/1956 | Abel |
| 2,954,768 | A | 10/1960 | Hamilton |
| 3,098,481 | A | 7/1963 | Lennart et al. |
| 3,670,728 | A | 6/1972 | Dabney |
| 3,793,935 | A | 2/1974 | Martin |
| 3,796,218 | A | 3/1974 | Burke et al. |
| 3,831,814 | A | 8/1974 | Butler |
| 4,020,837 | A | 5/1977 | Larson |
| 4,058,121 | A | 11/1977 | Choksi et al. |
| 4,464,981 | A * | 8/1984 | Stover ............... A47J 31/057 99/305 |
| 4,826,492 | A | 5/1989 | Magasi |
| 5,211,638 | A | 5/1993 | Dudar et al. |
| D365,630 | S | 12/1995 | Sullivan |
| 6,755,119 | B1 | 6/2004 | Lyall et al. |
| 6,989,004 | B2 | 1/2006 | Hinchliffe et al. |
| 6,990,891 | B2 | 1/2006 | Tebo, Jr. |
| 7,013,795 | B2 | 3/2006 | Mulle et al. |
| 7,017,472 | B2 | 3/2006 | Grant et al. |
| 7,024,983 | B2 | 4/2006 | Grant et al. |
| 7,093,530 | B2 | 8/2006 | Meister et al. |
| D536,925 | S | 2/2007 | Macler et al. |
| 7,337,704 | B2 | 3/2008 | Hammad et al. |
| 7,591,218 | B2 | 9/2009 | Bunn et al. |
| 7,592,027 | B2 | 9/2009 | Halliday et al. |
| 7,640,845 | B2 | 1/2010 | Woodnorth et al. |
| 7,650,831 | B2 | 1/2010 | Denisart et al. |
| 7,669,519 | B2 | 3/2010 | Pope et al. |
| 7,673,557 | B2 | 3/2010 | Bienvenu et al. |
| 7,685,932 | B2 | 3/2010 | Rahn et al. |
| 7,730,829 | B2 | 6/2010 | Hammad |
| 7,757,600 | B2 | 7/2010 | Jones et al. |
| 7,854,192 | B2 | 12/2010 | Denisart et al. |
| 7,866,255 | B1 | 1/2011 | Wroblewski et al. |
| 8,069,775 | B2 | 12/2011 | Russo |
| 8,327,755 | B1 | 12/2012 | Michalek et al. |
| 8,495,949 | B2 | 7/2013 | Tinkler et al. |
| 8,720,320 | B1 | 5/2014 | Rivera |
| 8,800,429 | B2 | 8/2014 | Cortese |
| 8,857,470 | B2 | 10/2014 | Rahimy et al. |
| 8,881,643 | B2 | 11/2014 | Baldo et al. |
| 8,916,215 | B2 | 12/2014 | Yoakim et al. |
| 8,967,038 | B2 | 3/2015 | Rivera |
| 9,023,412 | B2 | 5/2015 | Doleac et al. |
| 9,066,622 | B2 | 6/2015 | Denisart et al. |
| 9,079,706 | B2 | 7/2015 | Glucksman et al. |
| 9,084,511 | B2 | 7/2015 | Clark et al. |
| 9,101,243 | B2 | 8/2015 | Lee et al. |
| 9,125,992 | B2 | 9/2015 | Finke |
| 9,149,573 | B2 | 10/2015 | Baxter et al. |
| 9,155,418 | B2 | 10/2015 | Lai et al. |
| 9,179,797 | B2 | 11/2015 | Rivera |
| 9,192,260 | B2 | 11/2015 | Glucksman et al. |
| 9,247,846 | B2 | 2/2016 | Glucksman et al. |
| 9,271,598 | B2 | 3/2016 | Yoakim et al. |
| 9,282,849 | B2 | 3/2016 | Windler et al. |
| 9,352,138 | B2 | 5/2016 | Weilbacher et al. |
| 9,370,274 | B2 | 6/2016 | Bodum |
| 9,387,980 | B2 | 7/2016 | Dogan et al. |
| 9,398,826 | B2 | 7/2016 | Favero et al. |
| 9,398,828 | B1 | 7/2016 | Wroblewski et al. |
| 9,452,879 | B2 | 9/2016 | Fu et al. |
| 9,510,706 | B2 | 12/2016 | Tinkler et al. |
| 9,510,707 | B2 | 12/2016 | Mori et al. |
| 9,549,636 | B2 | 1/2017 | Smith et al. |
| 9,622,613 | B2 | 4/2017 | Sullivan et al. |
| 9,668,608 | B2 | 6/2017 | Mori et al. |
| 9,687,106 | B2 | 6/2017 | Boubeddi et al. |
| 9,687,108 | B2 | 6/2017 | Swerchesky |
| 9,700,171 | B2 | 7/2017 | Hanneson et al. |
| 9,713,573 | B2 | 7/2017 | Carlyon et al. |
| 9,756,974 | B2 | 9/2017 | Rivera |
| 9,770,129 | B2 | 9/2017 | Remo et al. |
| 9,795,243 | B2 | 10/2017 | Rivera |
| 9,795,245 | B2 | 10/2017 | Mulvaney et al. |
| 9,801,495 | B2 | 10/2017 | Oh |
| 9,844,295 | B2 | 12/2017 | Guo et al. |
| 9,854,934 | B2 | 1/2018 | Shi et al. |
| 9,918,586 | B2 | 3/2018 | Smith et al. |
| 9,930,989 | B2 | 4/2018 | Rosati et al. |
| 9,949,590 | B2 | 4/2018 | Bartoli et al. |
| 9,968,216 | B2 | 5/2018 | Smith et al. |
| 9,968,218 | B2 | 5/2018 | Burrows |
| 9,974,410 | B2 | 5/2018 | Ferrier |
| 9,999,315 | B2 | 6/2018 | Crarer et al. |
| 10,058,208 | B2 | 8/2018 | Smith et al. |
| 10,130,206 | B2 | 11/2018 | Rijskamp et al. |
| 10,136,754 | B2 | 11/2018 | Smith et al. |
| 10,144,580 | B2 | 12/2018 | Schwarz et al. |
| 10,150,610 | B2 | 12/2018 | Bartoli et al. |
| 10,188,238 | B2 | 1/2019 | Dammermann et al. |
| 10,194,768 | B2 | 2/2019 | Van Der Woning et al. |
| 10,226,151 | B2 | 3/2019 | Corti |
| 10,251,509 | B2 | 4/2019 | Rivera et al. |
| 10,307,012 | B2 | 6/2019 | Hart et al. |
| 10,307,014 | B2 | 6/2019 | Starr et al. |
| 10,342,377 | B2 | 7/2019 | Cable et al. |
| 10,398,254 | B2 | 9/2019 | Tinkler et al. |
| 10,398,257 | B2 | 9/2019 | Meng |
| 10,399,769 | B2 | 9/2019 | Talon et al. |
| 10,455,972 | B2 | 10/2019 | Rivera |
| 10,455,974 | B2 | 10/2019 | Talon |
| 10,485,371 | B2 | 11/2019 | Lüssi et al. |
| 10,485,372 | B2 | 11/2019 | Rijskamp et al. |
| 10,538,380 | B2 | 1/2020 | Talon et al. |
| 10,568,454 | B2 | 2/2020 | Balkau |
| 10,575,673 | B2 | 3/2020 | Spiegel et al. |
| 10,610,048 | B2 | 4/2020 | Gaillard et al. |
| 10,716,429 | B2 | 7/2020 | Rotta et al. |
| 10,822,160 | B2 | 11/2020 | Talon et al. |
| 10,827,874 | B2 | 11/2020 | Moon et al. |
| 10,849,453 | B2 | 12/2020 | Moon et al. |
| 10,881,241 | B2 | 1/2021 | Burrows |
| 10,925,429 | B2 | 2/2021 | Sachtleben |
| 10,926,945 | B2 | 2/2021 | Kennedy et al. |
| 10,932,607 | B2 | 3/2021 | Marschke et al. |
| 10,945,552 | B2 | 3/2021 | Branko et al. |
| 11,039,712 | B2 | 6/2021 | Egli et al. |
| 11,051,649 | B2 | 7/2021 | Anthony et al. |
| 11,071,818 | B2 | 7/2021 | Tornqvist |
| 11,083,331 | B2 | 8/2021 | Hanes et al. |
| 11,089,901 | B2 | 8/2021 | Apone et al. |
| 11,129,491 | B2 | 9/2021 | Park et al. |
| 11,178,996 | B2 | 11/2021 | Hess et al. |
| 11,178,999 | B2 | 11/2021 | Crozier et al. |
| 11,213,161 | B2 | 1/2022 | Wessels et al. |
| 11,247,838 | B2 | 2/2022 | Cedergren |
| 11,284,738 | B2 | 3/2022 | Cahen et al. |
| 2005/0051033 | A1 | 3/2005 | Lassota |
| 2006/0081132 | A1 | 4/2006 | Kief |
| 2006/0147351 | A1 | 7/2006 | Falb et al. |
| 2007/0107604 | A1 | 5/2007 | Wei |
| 2007/0157821 | A1 | 7/2007 | Panesar et al. |
| 2008/0041234 | A1 | 2/2008 | Cortese |
| 2009/0130270 | A1 | 5/2009 | Cortese |
| 2011/0017074 | A1 | 1/2011 | Goeltenboth |

(56) References Cited

U.S. PATENT DOCUMENTS

| | | |
|---|---|---|
| 2011/0168029 A1 | 7/2011 | Fulco |
| 2012/0052171 A1 | 3/2012 | Starr et al. |
| 2013/0078342 A1 | 3/2013 | Loebl |
| 2013/0133522 A1 | 5/2013 | Denisart et al. |
| 2013/0253448 A1 | 9/2013 | Baron et al. |
| 2014/0013958 A1 | 1/2014 | Krasne et al. |
| 2014/0199452 A1 | 7/2014 | Skalski et al. |
| 2014/0238502 A1 | 8/2014 | Ko et al. |
| 2014/0311352 A1 | 10/2014 | Capitani |
| 2014/0352545 A1 | 12/2014 | Cahen et al. |
| 2015/0033947 A1 | 2/2015 | Van Der Kamp et al. |
| 2015/0059588 A1 | 3/2015 | Castellani |
| 2015/0327713 A1 | 11/2015 | Pruitt |
| 2015/0359377 A1 | 12/2015 | Graham |
| 2016/0183717 A1 | 6/2016 | Ostan et al. |
| 2017/0099983 A1 | 4/2017 | Hanes et al. |
| 2017/0172338 A1 | 6/2017 | Burrows |
| 2017/0251866 A1 | 9/2017 | Garcia |
| 2017/0367518 A1 | 12/2017 | Anthony et al. |
| 2018/0162634 A1 | 6/2018 | De Ruvo et al. |
| 2019/0350404 A1 | 11/2019 | Pugliese et al. |
| 2020/0085227 A1 | 3/2020 | Ozanne |
| 2020/0093319 A1 | 3/2020 | Teo et al. |
| 2020/0154933 A1 | 5/2020 | Kuang |
| 2020/0245805 A1 | 8/2020 | Demiglio et al. |
| 2020/0268195 A1 | 8/2020 | Rognon |
| 2020/0305634 A1 | 10/2020 | Rivera |
| 2020/0352389 A1 | 11/2020 | De Vries et al. |
| 2021/0127889 A1 | 5/2021 | Sasena et al. |
| 2021/0137302 A1 | 5/2021 | Rivera |
| 2021/0289982 A1* | 9/2021 | Smith ............... A47J 31/461 |
| 2021/0330118 A1 | 10/2021 | Hanes et al. |
| 2021/0345817 A1 | 11/2021 | Rivera |
| 2021/0345822 A1 | 11/2021 | Johnson et al. |

FOREIGN PATENT DOCUMENTS

| | | |
|---|---|---|
| CA | 2763746 A1 | 12/2010 |
| CN | 201603250 U | 10/2010 |
| CN | 203252455 U | 10/2013 |
| CN | 204909064 U | 12/2015 |
| CN | 205006660 U | 2/2016 |
| CN | 106175452 A | 12/2016 |
| CN | 107157330 A | 9/2017 |
| CN | 107205570 A | 9/2017 |
| CN | 206714777 U | 12/2017 |
| CN | 208551328 U | 3/2019 |
| CN | 208658874 U | 3/2019 |
| CN | 210300686 U | 4/2020 |
| CN | 111297199 A | 6/2020 |
| CN | 111820745 A | 10/2020 |
| CN | 111887722 A | 11/2020 |
| CN | 211883421 U | 11/2020 |
| CN | 211983746 U | 11/2020 |
| CN | 112244646 A | 1/2021 |
| CN | 113197486 A | 8/2021 |
| DE | 202014103681 U1 | 8/2014 |
| EP | 0158697 A1 | 10/1985 |
| EP | 0174011 A2 | 3/1986 |
| EP | 0452595 A1 | 10/1991 |
| EP | 1698318 A1 | 9/2006 |
| EP | 1582127 B1 | 8/2007 |
| EP | 1502526 B8 | 9/2007 |
| EP | 1842465 A3 | 3/2008 |
| EP | 2238998 A1 | 10/2010 |
| EP | 2247257 A1 | 11/2010 |
| EP | 1711742 B1 | 3/2013 |
| EP | 2866621 B1 | 4/2016 |
| EP | 3116356 A4 | 1/2018 |
| EP | 3372122 A1 | 9/2018 |
| EP | 3395384 A1 | 10/2018 |
| EP | 3398486 A1 | 11/2018 |
| EP | 3045092 B1 | 12/2018 |
| EP | 3045091 B1 | 7/2019 |
| EP | 3586703 B1 | 11/2020 |
| EP | 3893703 A1 | 10/2021 |
| ES | 2314606 T3 | 3/2009 |
| FR | 1504415 A | 12/1967 |
| FR | 1529333 A | 6/1968 |
| FR | 2898797 A3 | 9/2007 |
| GB | 829383 A | 3/1960 |
| GB | 2413480 A | 3/2004 |
| IN | 2891984 Y | 4/2007 |
| KR | 101326682 B1 | 11/2013 |
| KR | 101493822 B1 | 2/2015 |
| KR | 101572956 B1 | 11/2015 |
| KR | 101750003 B1 | 6/2017 |
| KR | 101786497 B1 | 10/2017 |
| KR | 101832756 B1 | 2/2018 |
| KR | 101832767 B1 | 4/2018 |
| KR | 101975380 B1 | 5/2019 |
| WO | 2014073822 A1 | 5/2014 |
| WO | 2014092406 A1 | 6/2014 |
| WO | 2017031212 A1 | 2/2017 |
| WO | 2017123903 A1 | 7/2017 |
| WO | 2020092472 A2 | 5/2020 |
| WO | 2021061615 A1 | 4/2021 |
| WO | 2021122495 A1 | 6/2021 |
| WO | 2021246866 A1 | 12/2021 |

OTHER PUBLICATIONS

U.S. Appl. No. 17/138,575, filed Dec. 30, 2020, Hybrid Receptacle Beverage Brewing System.

International Search Report and Written Opinion received for PCT Application No. PCT/US2021/064489, mailed on May 31, 2022, 13 pages.

Milan Gold, Global Food Industry, No. 08, 2008, pp. 74.

* cited by examiner

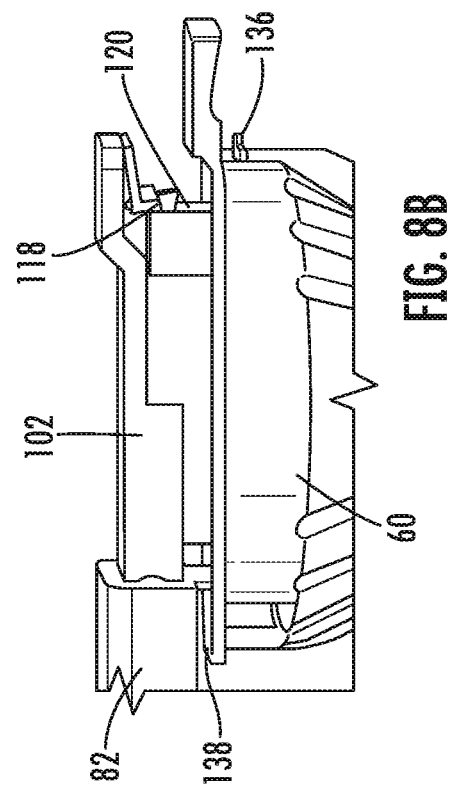
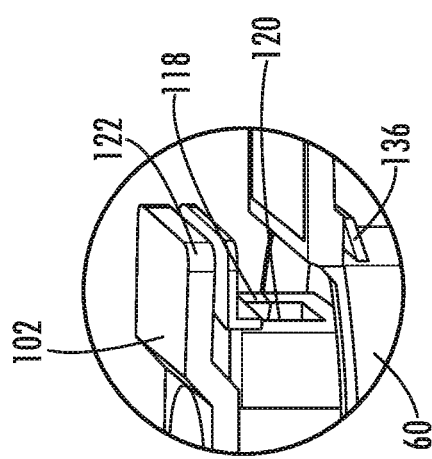
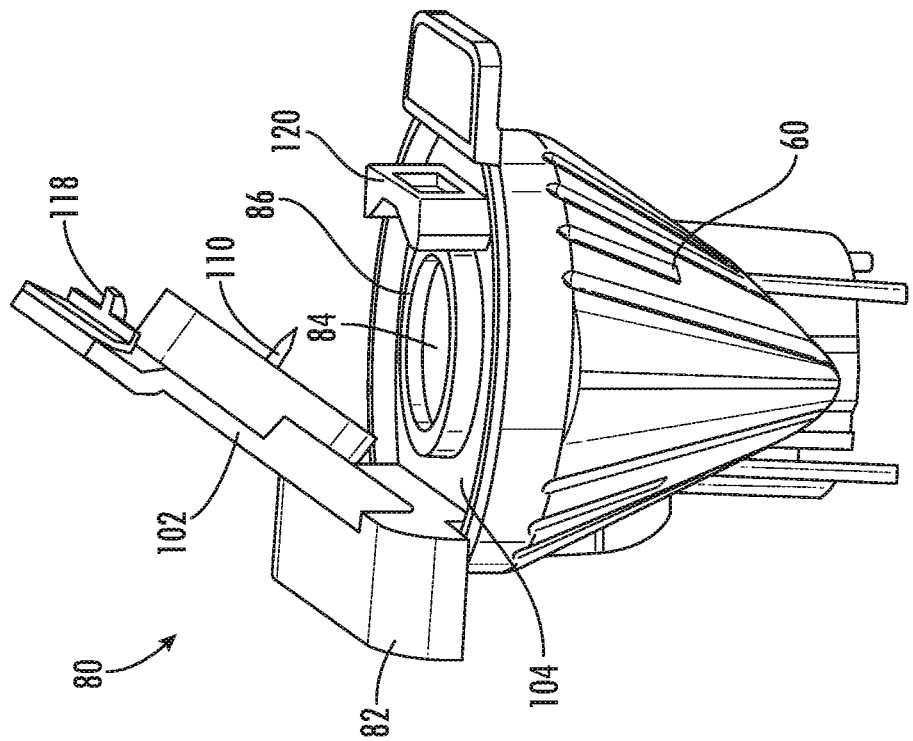

HYBRID RECEPTACLE BEVERAGE BREWING SYSTEM

CROSS REFERENCE TO RELATED APPLICATION

This application is a divisional of U.S. patent application Ser. No. 17/139,488, entitled "Hybrid Receptacle Beverage Brewing System," filed on Dec. 31, 2020, which is a continuation of U.S. application Ser. No. 17/138,575, entitled "Hybrid Receptacle Beverage Brewing System," filed Dec. 30, 2020, each of which is hereby incorporated by reference herein in its entirety.

FIELD

Exemplary embodiments of the present disclosure relate to a system and method for brewing beverages, and more particularly to a system and method for preparing various types of brew beverages using flavorants provided in multiple formats.

BACKGROUND

Various systems and methods for brewing a beverage, such as coffee or tea, are known. These systems typically include drip brewing systems in which hot water is brewed through coffee grounds and into a carafe or French press systems in which coffee grounds and water are mixed in a container and a water permeable plunger is pressed into the container from above to trap the ground coffee at the bottom of the container. Existing beverage brewing systems are typically designed to receive only a single format of flavorant, such as loose coffee grinds, or alternatively, or a prepackaged capsule or cartridge of coffee grinds.

Accordingly, a beverage brewing system capable of easily brewing beverages using a flavorant provided in a plurality of formats in a time efficient manner is desirable.

SUMMARY

According to one embodiment, a system for preparing a brewed beverage from at least one flavorant includes a housing, a receptacle connectable to the housing for holding the at least one flavorant and a reservoir connectable to the housing. The receptacle including a first fluid inlet and a second fluid inlet and a first fluid flow path fluidly connects the reservoir to the first fluid inlet and a second fluid flow path fluidly connects the reservoir to the second fluid inlet.

In addition to one or more of the features described above, or as an alternative, in further embodiments said receptacle has a fluid outlet, both said first fluid inlet and said second fluid inlet being arranged in fluid communication with said fluid outlet.

In addition to one or more of the features described above, or as an alternative, in further embodiments said second fluid inlet is vertically offset from said first fluid inlet.

In addition to one or more of the features described above, or as an alternative, in further embodiments said receptacle includes a brew basket removably connectable to said housing and an adapter removably connectable to said housing in overlapping arrangement with said brew basket.

In addition to one or more of the features described above, or as an alternative, in further embodiments said first fluid inlet is positioned to deliver fluid to a first brew chamber defined by said brew basket and said second fluid inlet is positioned to deliver said fluid to a second brew chamber defined by said adapter.

In addition to one or more of the features described above, or as an alternative, in further embodiments said first brew chamber is shaped and positioned to receive a loose configuration of the at least one flavorant and said second brew chamber is shaped and positioned to receive a cartridge including the at least one flavorant.

In addition to one or more of the features described above, or as an alternative, in further embodiments comprising a filter positionable within said brew basket to receive said loose configuration of the at least one flavorant.

In addition to one or more of the features described above, or as an alternative, in further embodiments when said adapter is connected to said housing, said first fluid flow path is sealed.

In addition to one or more of the features described above, or as an alternative, in further embodiments when said adapter is connected to said housing, a portion of said adapter overlaps said first fluid inlet to seal said first fluid inlet.

In addition to one or more of the features described above, or as an alternative, in further embodiments comprising at least one valve in communication with said first fluid flow path and said second fluid flow path, wherein said at least one valve is operable to control a flow to said first fluid flow path and said second fluid flow path in response to a configuration of said receptacle.

According to another embodiment, a system for preparing a brewed beverage from at least one flavorant includes a housing having a first fluid outlet, a second fluid outlet, and a third fluid outlet, a reservoir associated with the housing, and a fluid delivery system within the housing. The fluid delivery system includes a first fluid flow path fluidly connecting the reservoir to the first fluid outlet, a second fluid flow path fluidly connecting said reservoir to the second fluid outlet; and a third fluid flow path fluidly connecting the reservoir to the third fluid outlet.

In addition to one or more of the features described above, or as an alternative, in further embodiments comprising a receptacle connectable to said housing, said receptacle defining at least one brew chamber for receiving the at least one flavorant, wherein at least one of said first fluid outlet, said second fluid outlet, and said third fluid outlet is positioned to deliver a fluid to said at least one brew chamber.

In addition to one or more of the features described above, or as an alternative, in further embodiments said first fluid outlet and said second fluid outlet are arranged in fluid communication with said at least one brew chamber.

In addition to one or more of the features described above, or as an alternative, in further embodiments said receptacle includes a brew basket removably connectable to said housing and an adapter removably connected to said housing in overlapping arrangement with said brew basket.

In addition to one or more of the features described above, or as an alternative, in further embodiments said first fluid outlet is positioned to deliver fluid to a first brew chamber defined by said brew basket and said second fluid outlet is positioned to deliver said fluid to a second brew chamber defined by said adapter.

In addition to one or more of the features described above, or as an alternative, in further embodiments at least one of said first fluid outlet, said second fluid outlet, and said third fluid outlet is located remotely from said at least one brew chamber.

In addition to one or more of the features described above, or as an alternative, in further embodiments comprising at least one valve in communication with said first fluid flow path and said second fluid flow path and said third fluid flow path, wherein said at least one valve is operable to control a flow to said first fluid flow path, said second fluid flow path, and said third fluid flow path in response to a configuration of said receptacle.

In addition to one or more of the features described above, or as an alternative, in further embodiments said fluid delivery system further comprises a heating mechanism and each of said first fluid flow path, said second fluid flow path, and said third fluid flow path is thermally coupled to said heating mechanism.

According to another embodiment, a cartridge adapter for use in a beverage brewing system for preparing a brewed beverage from at least one flavorant includes an adapter housing, a cartridge cavity defined by the adapter housing and a fluid input that is sealingly engageable with a fluid output of the beverage brewing system.

In addition to one or more of the features described above, or as an alternative, in further embodiments said fluid input is rotatable about an axis relative to said adapter housing to sealingly engage with said fluid output of the beverage brewing system.

In addition to one or more of the features described above, or as an alternative, in further embodiments said cavity includes a first portion adjacent a first end of the cavity and a second portion adjacent a second end of said cavity, said cartridge being receivable within said second portion and said fluid input being receivable within said first portion.

In addition to one or more of the features described above, or as an alternative, in further embodiments said fluid input is vertically aligned with said cartridge within said cavity.

In addition to one or more of the features described above, or as an alternative, in further embodiments said fluid input includes a needle, said needle being positioned within said cartridge when said fluid input is sealingly engaged with said fluid output.

In addition to one or more of the features described above, or as an alternative, in further embodiments said needle includes at least one opening for communicating fluid from said fluid input to said cartridge.

In addition to one or more of the features described above, or as an alternative, in further embodiments comprising a lid operably coupled to said fluid input, wherein said fluid input sealingly engages with said fluid output in response to movement of said lid.

According to another embodiment, a cartridge adapter for use in a beverage brewing system for preparing a brewed beverage from at least one flavorant includes an adapter housing, a cartridge cavity defined by the adapter housing, a primary lid coupled to the adapter housing and movable between an open position and a closed position and a secondary lid disposed between the primary lid and the cavity, the secondary lid being movable to close the cavity.

In addition to one or more of the features described above, or as an alternative, in further embodiments said cartridge cavity includes a cartridge chamber sized and positioned to receive a cartridge, and said secondary lid is movable to close said cartridge chamber.

In addition to one or more of the features described above, or as an alternative, in further embodiments said secondary lid is movable to seal said cartridge chamber.

In addition to one or more of the features described above, or as an alternative, in further embodiments said primary lid includes a first feature and said adapter housing includes a second feature, and when said primary lid is in said closed position, said first feature and said second feature are engaged.

In addition to one or more of the features described above, or as an alternative, in further embodiments secondary lid includes a latch receivable within an opening formed in said adapter housing.

In addition to one or more of the features described above, or as an alternative, in further embodiments comprising a coupling mechanism including: a first portion operably coupled to said primary lid, a second portion associated with said secondary lid, and a pin movable relative to said first portion and said second portion.

In addition to one or more of the features described above, or as an alternative, in further embodiments when said secondary lid is offset from said cavity, said first portion is affixed to said second portion.

In addition to one or more of the features described above, or as an alternative, in further embodiments when said first portion is affixed to said second portion, said pin is extends between said first portion and said second portion.

In addition to one or more of the features described above, or as an alternative, in further embodiments when said secondary lid is positioned within said cavity, said first portion and said second portion are decoupled.

In addition to one or more of the features described above, or as an alternative, in further embodiments when said first portion and said second portion are decoupled, said pin is positioned within said first portion and said second portion is translatable relative to said first portion.

In addition to one or more of the features described above, or as an alternative, in further embodiments said secondary lid further comprises a needle receivable within said cavity.

In addition to one or more of the features described above, or as an alternative, in further embodiments when said primary lid is open, said primary lid is spaced from said secondary lid.

In addition to one or more of the features described above, or as an alternative, in further embodiments when said primary lid is closed, said primary lid is arranged in contact with said secondary lid.

According to another embodiment, a system for preparing a brewed beverage from at least one flavorant includes a housing, a receptacle associated the said housing for holding the at least one flavorant, a reservoir associated with the housing, and a shower head arranged in fluid communication with the reservoir. The shower head being movable relative to at least one of the receptacle and the housing between an extended position and a retracted position.

In addition to one or more of the features described above, or as an alternative, in further embodiments said system further comprises a door movable relative to said housing, said shower head positioned within said door.

In addition to one or more of the features described above, or as an alternative, in further embodiments said shower head is integrally formed with said door.

In addition to one or more of the features described above, or as an alternative, in further embodiments when said shower head is in said extended position, an end of said receptacle is sealed against said door.

In addition to one or more of the features described above, or as an alternative, in further embodiments when said shower head is in said retracted position, said shower head is at least partially located within a chamber of said housing.

In addition to one or more of the features described above, or as an alternative, in further embodiments said showerhead is translatable between said extended position and said retracted position.

In addition to one or more of the features described above, or as an alternative, in further embodiments when said shower head is in said extended position, at least one opening of said shower head is disposed vertically above said receptacle.

In addition to one or more of the features described above, or as an alternative, in further embodiments when said shower head is in said retracted position, a fluid flow to said shower head is blocked.

According to another embodiment, a system for preparing a brewed beverage from at least one flavorant includes a housing, a cavity associated with the housing for containing the at least one flavorant, and a plurality of needles insertable into the cavity. Each of the plurality of needles has a spray pattern associated therewith. The plurality of needles being positioned such that a spray pattern associated with each needle of the plurality of needles overlaps another spray pattern associated with another needle of the plurality of needles.

In addition to one or more of the features described above, or as an alternative, in further embodiments when said plurality of needles are inserted into said cavity, said plurality of needles are equidistantly spaced about a central axis of said cavity.

In addition to one or more of the features described above, or as an alternative, in further embodiments said spray pattern associated with each of said plurality of needles is substantially identical.

In addition to one or more of the features described above, or as an alternative, in further embodiments each of said plurality of needles includes at least one opening formed therein and said spray pattern associated with each of said plurality of needles is defined by said at least one opening.

In addition to one or more of the features described above, or as an alternative, in further embodiments at least one of said plurality of needles has a rectangular opening that wraps about at least a portion of a periphery of said at least one needle.

In addition to one or more of the features described above, or as an alternative, in further embodiments said rectangular opening wraps about said periphery of said at least one needle between 10 degrees and 180 degrees.

In addition to one or more of the features described above, or as an alternative, in further embodiments said plurality of needles is three needles.

According to another embodiment, a system for preparing a brewed beverage from at least one flavorant includes a housing, a cavity associated with the housing for containing the at least one flavorant, and a plurality of needles insertable into the cavity. Each of the plurality of needles has a spray pattern associated therewith and the spray pattern associated with at least one of the plurality of needles is uniform in dimension with at least another of the spray patterns.

In addition to one or more of the features described above, or as an alternative, in further embodiments each of said plurality of needles includes at least one opening formed therein and said spray pattern associated with each of said plurality of needles is defined by said at least one opening.

In addition to one or more of the features described above, or as an alternative, in further embodiments said at least one opening of each of said plurality of needles is vertically aligned.

In addition to one or more of the features described above, or as an alternative, in further embodiments a geometry of said at least one opening of each of said plurality of needles is substantially identical.

In addition to one or more of the features described above, or as an alternative, in further embodiments said at least one opening of at least one needle of said plurality of needles is a rectangular opening that wraps about a portion of a periphery of said at least one needle.

In addition to one or more of the features described above, or as an alternative, in further embodiments said rectangular opening wraps about said periphery of said at least one needle between 10 degrees and 180 degrees.

In addition to one or more of the features described above, or as an alternative, in further embodiments when said plurality of needles are inserted into said cavity, said plurality of needles are equidistantly spaced about a central axis of said cavity.

In addition to one or more of the features described above, or as an alternative, in further embodiments spray pattern associated with each needle of said plurality of needles overlaps another spray pattern associated with another needle of said plurality of needles.

In addition to one or more of the features described above, or as an alternative, in further embodiments said plurality of needles is at least three needles.

According to yet another embodiment, a system for preparing a brewed beverage from at least one flavorant a housing, a cavity associated with the housing for containing the at least one flavorant, and a plurality of needles insertable into the cavity. A geometry of each of the plurality of needles is substantially identical.

In addition to one or more of the features described above, or as an alternative, in further embodiments each of said plurality of needles includes at least one opening formed therein and a spray pattern associated with each of said plurality of needles is defined by said at least one opening.

In addition to one or more of the features described above, or as an alternative, in further embodiments a geometry of said at least one opening of each of said plurality of needles is substantially identical.

In addition to one or more of the features described above, or as an alternative, in further embodiments said at least one opening of each of said plurality of needles is vertically aligned.

In addition to one or more of the features described above, or as an alternative, in further embodiments said at least one opening of each of said plurality of needles is a rectangular opening that wraps about a portion of a periphery of said at least one needle.

In addition to one or more of the features described above, or as an alternative, in further embodiments said rectangular opening wraps about said periphery of said at least one needle between 10 degrees and 180 degrees.

In addition to one or more of the features described above, or as an alternative, in further embodiments when said plurality of needles are inserted into said cavity, said plurality of needles are equidistantly spaced about a central axis of said cavity.

In addition to one or more of the features described above, or as an alternative, in further embodiments a spray pattern associated with each needle of said plurality of needles overlaps another spray pattern associated with another needle of said plurality of needles.

In addition to one or more of the features described above, or as an alternative, in further embodiments a spray pattern associated with each of said plurality of needles is substantially identical.

In addition to one or more of the features described above, or as an alternative, in further embodiments said plurality of needles is at least three needles.

According to another embodiment, a system for preparing a brewed beverage from at least one flavorant includes a housing, a cavity associated with the said housing for containing the at least one flavorant, and a plurality of needles insertable into the cavity. Each of the plurality of needles has a spray pattern associated therewith and the spray pattern associated with each of the plurality of needles has a direction component extending towards another needle of the plurality of needles.

In addition to one or more of the features described above, or as an alternative, in further embodiments said spray pattern associated with each of said plurality of needles has a horizontal component and a vertical component, said horizontal component being oriented towards said another needle of said plurality of needles.

In addition to one or more of the features described above, or as an alternative, in further embodiments said spray pattern associated with each needle of said plurality of needles overlaps another spray pattern associated with another needle of said plurality of needles.

In addition to one or more of the features described above, or as an alternative, in further embodiments said plurality of needles is three needles.

In addition to one or more of the features described above, or as an alternative, in further embodiments each of said plurality of needles includes at least one opening formed therein and said spray pattern associated with each of said plurality of needles is defined by said at least one opening.

In addition to one or more of the features described above, or as an alternative, in further embodiments a geometry of said at least one opening of each of said plurality of needles is substantially identical.

In addition to one or more of the features described above, or as an alternative, in further embodiments said at least one opening of each of said plurality of needles is vertically aligned.

In addition to one or more of the features described above, or as an alternative, in further embodiments said at least one opening of each of said plurality of needles is a rectangular opening that wraps about a portion of a periphery of said at least one needle.

In addition to one or more of the features described above, or as an alternative, in further embodiments said rectangular opening wraps about said periphery of said at least one needle between 10 degrees and 180 degrees.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 8A is a perspective view of an adapter for use with the beverage brewing system in an open configuration according to an embodiment;

FIG. 8B is a perspective view of the adapter of FIG. 8A for use with the beverage brewing system in a closed configuration according to an embodiment;

FIG. 8C is a detailed perspective view of the features used to maintain the lid of the adapter of FIGS. 8A and 8B in a closed configuration in the closed configuration according to an embodiment;

The detailed description explains embodiments of the disclosure, together with advantages and features, by way of example with reference to the drawings.

DETAILED DESCRIPTION

Aspects and embodiments disclosed herein include a system and method for preparing various types of brewed beverages, including both hot and cold brewed beverages. Although the disclosure is described herein with reference to preparing a brewed coffee or tea beverage, preparation of other brewed beverages is within the scope of the disclosure. As the term is used herein, "coffee" refers to a beverage including solids extracted from coffee beans and dissolved in water.

Figure 1:
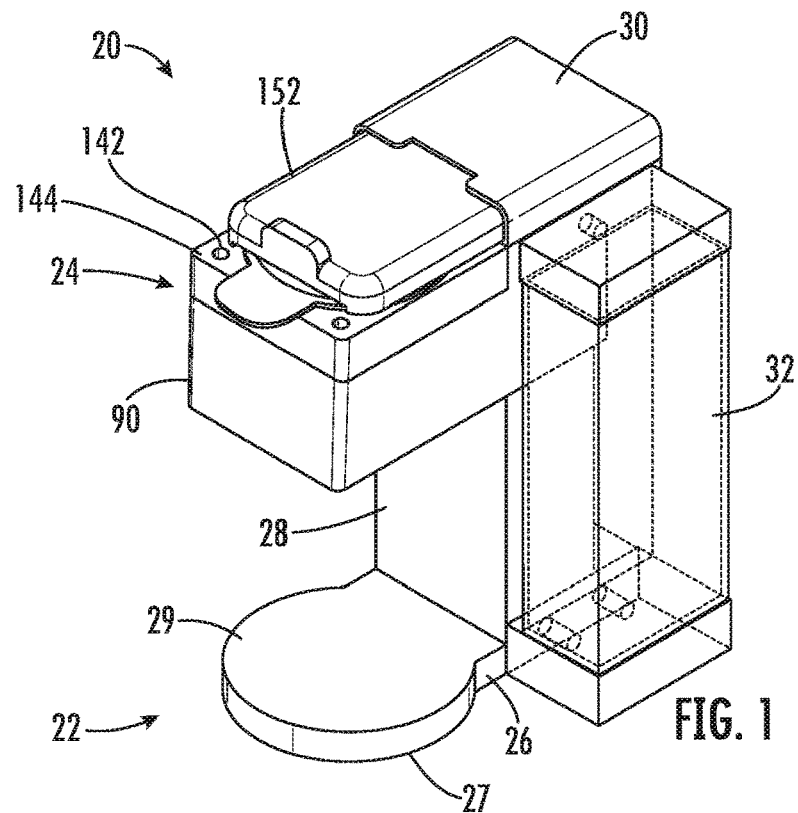
FIG. 1 is a perspective view of a beverage brewing system according to an embodiment.
Figure 2:
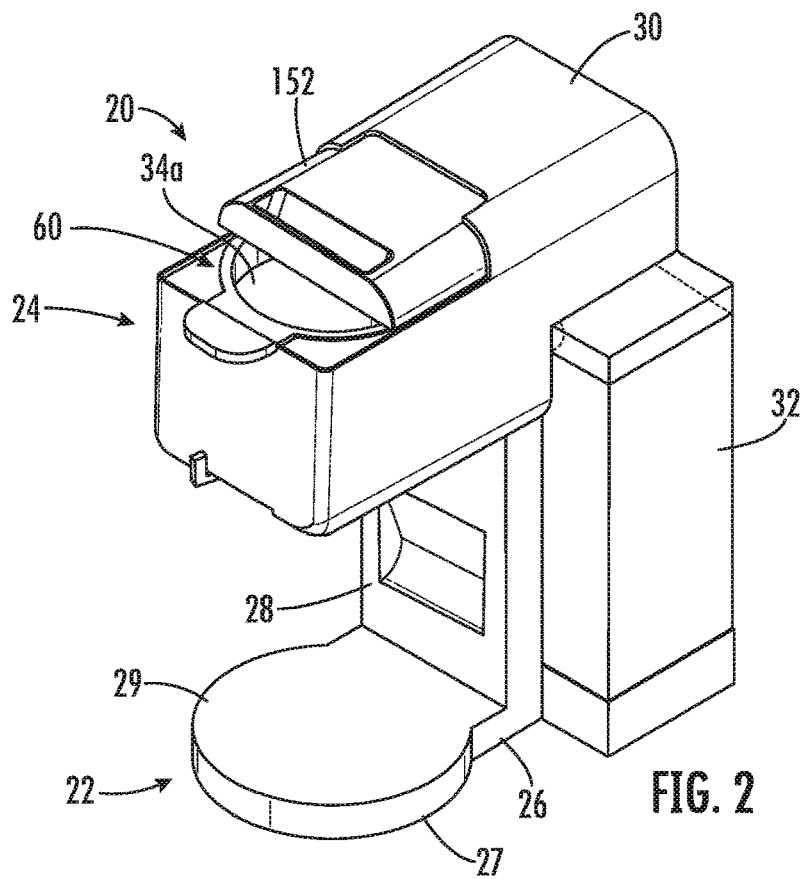
FIG. 2 is a perspective view of the beverage brewing system of FIG. 1 with a movable door in a partially open configuration according to an embodiment.

With reference now to FIGS. 1 and 2, an example of a system 20 operable to prepare a brewed beverage and suitable for use on a support surface 22, such as a countertop for example, is illustrated. In the illustrated, non-limiting embodiment, the beverage brewing system 20 includes a housing 24 having a base 26, a first support member 28, and a second support member 30. Any of the base 26, first support member 28, and second support member 30 may be integrally formed, or alternatively, may be separate components affixed together in a suitable manner. A bottom surface 27 of the base 26 may be positionable in contact with the support surface 22. Further, an upper surface 29 of the base 26 may define an area for positioning a container 40 (see FIG. 3) configured to receive a brewed beverage output from the beverage brewing system 20 therein. A heating element (not shown) may be positioned within the base 26 of the housing 24, the heating element being operable to heat the area of the upper surface 29 configured to receive a container 40. Accordingly, operation of such a heating element may be used to maintain the container 40 and/or a brewed beverage contained therein at a desired temperature.

As shown, the base 26 and the second support member 30 are generally located at opposite ends of the vertically extending first support member 28. Further, although the base 26 and the second support member 30 are illustrated as extending from the first support member 28 in the same direction, embodiments where the base 26 and the second support member 30 extend in different directions are also contemplated herein. In an embodiment, at least a portion of the housing 24, such as the first and/or second support member 28, 30 for example, is generally hollow, and one or more components of the beverage brewing system 20 may be located therein.

Figure 7:
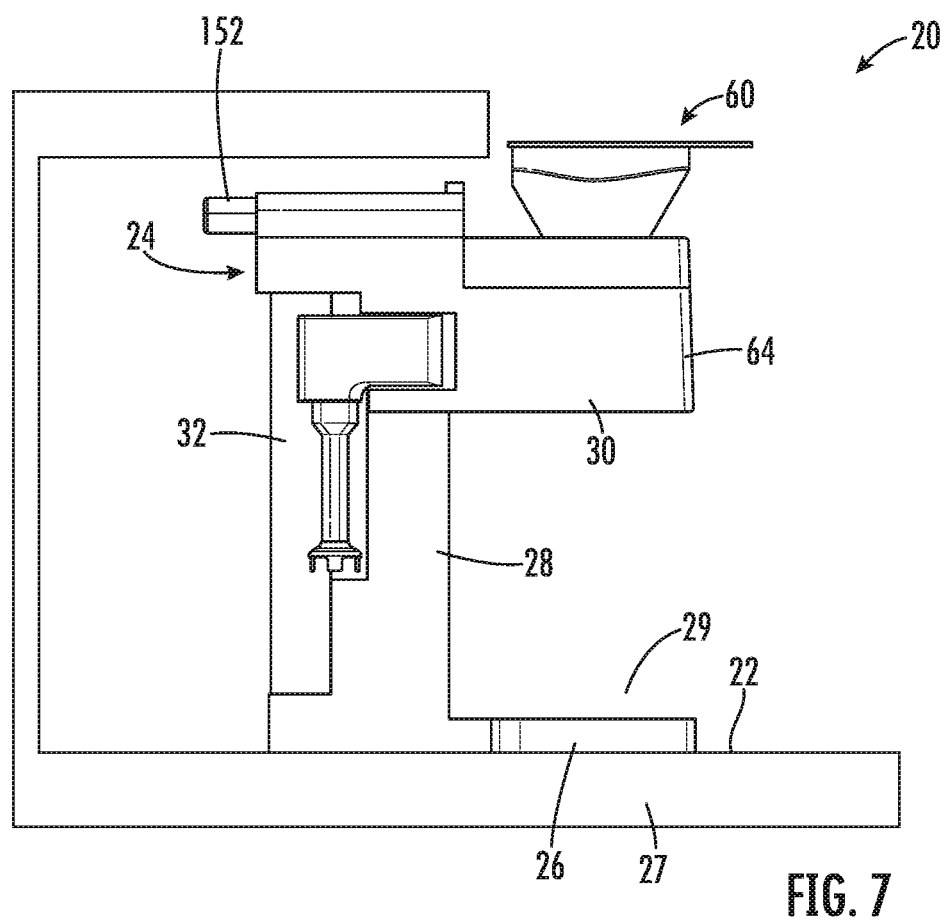
FIG. 7 is a side view of a beverage brewing system having a brew basket removably installed relative to the housing according to an embodiment.

With continued reference to FIGS. 1 and 2, the beverage brewing system 20 additionally includes a reservoir 32. In the illustrated, non-limiting embodiment, the reservoir 32 is arranged adjacent a side of the housing 24, such as adjacent a portion of one or more of the base 26, first support member 28, and the second support member 30 for example. However, in other embodiments, the reservoir 32 may be arranged at another location about the housing 24, such as at a back surface of the housing 24, as shown in FIG. 7. The reservoir 32 is configured to store a desired amount of fluid therein, such as water for example, for brewing a beverage including but not limited to coffee or tea. In some embodiments, the reservoir 32 is removably connectable to the housing 24 for ease of use. However, embodiments where the system 20 does not include a reservoir 32 are also within the scope of the disclosure. In such embodiments, the system 20 may be connected to a fluid source (not shown) and configured to receive a desired amount of fluid therefrom on demand.

Figure 3:
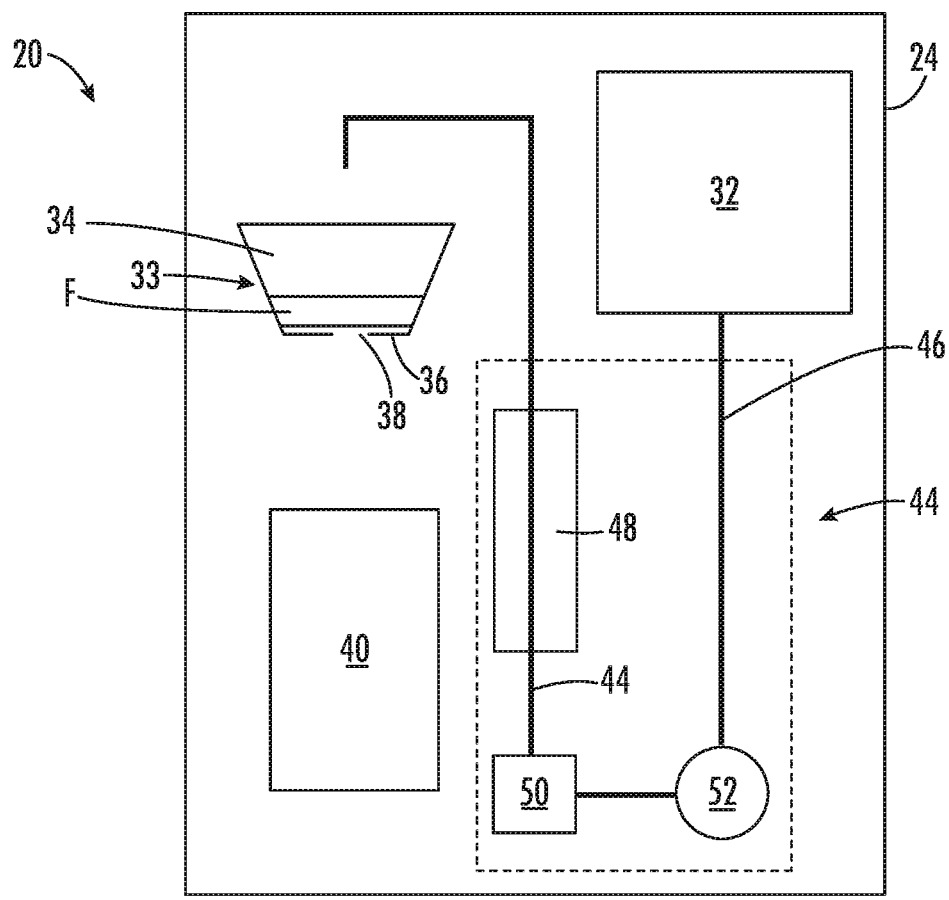
FIG. 3 is a schematic diagram of the beverage brewing system according to an embodiment.
Figure 4:
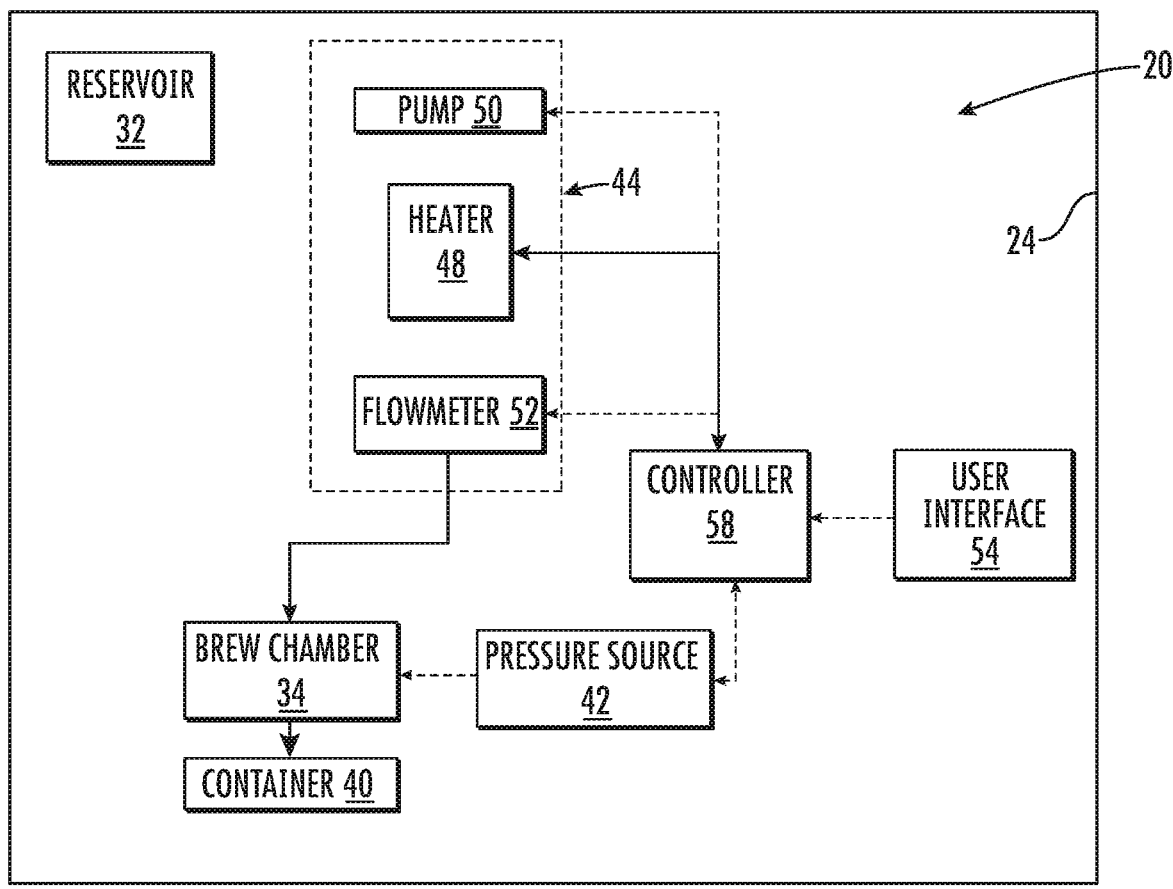
FIG. 4 is another schematic diagram of the beverage brewing system according to an embodiment.

With continued reference to FIGS. 1 and 2, and further reference to the schematic diagrams of FIGS. 3 and 4, the system 20 additionally includes a receptacle 33 having a brew chamber 34 (best shown in FIG. 3) within which a flavorant F, such as coffee grinds or tea leaves, may be positioned. Although the receptacle 33 is illustrated and described herein as being removably connected to the housing 24, embodiments where all of a portion of the receptacle is permanently affixed to the housing 24 are also within the scope of the disclosure. It should be understood that as used herein, the term "flavorant" is intended to include any suitable material capable of being used to infuse a beverage, such as fruit, vegetables, herbs, or other materials for example. In the illustrated, non-limiting embodiment, the receptacle 33 is positionable generally adjacent a distal end 64 of the second support member 30. An outlet 36 of the receptacle 33 typically includes an opening 38 through which a fluid, such as water, infused with flavorant F is expelled from the brew chamber 34 and the receptacle 33. From the brew chamber 34, the brewed beverage is directed into an adjacent container 40 either directly or through one or more conduits or chambers. Examples of containers 40 suitable for use with the beverage brewing system 20, include, but are not limited to, a carafe, a half-carafe, a travel mug, and a cup or mug for example.

In an embodiment, the brewed beverage may be configured to drip via gravity from the opening 38 into the adjacent container 40. Alternatively, or in addition, a pressure source 42 may be arranged in fluid communication with the brew chamber 34 and is operable to force the infused water from the brew chamber 34. Examples of the pressure source 42 include but are not limited to a motorized air pump or pressure pump for example, operable to pressurize the interior of the brew chamber 34. In such embodiments, a valve or other venting mechanism (not shown) associated with the brew chamber 34 may be operated to vent or release pressure from the brew chamber 34 to the atmosphere. Such a venting mechanism may be operably coupled to the pressure source 42 or to a controller 58 of the beverage brewing system 20. In an embodiment, the beverage brewing system 20 may include a steeping valve (not shown) operable to selectively seal the opening 38 and retain water within the brew chamber 34 of the receptacle 33, for example to allow the flavorant F to steep within the water. The steeping valve may be movable between an open and closed position by any suitable means, such as an actuator (not shown) for example. However, embodiments of the system that do not include a steeping valve and/or actuator are also contemplated herein.

A fluid delivery system 44 disposed within the housing 24 is configured to communicate fluid from the reservoir 32 to the brew chamber 34. The fluid delivery system 44 includes at least one fluid supply line or conduit 46 extending between an outlet end of the reservoir 32 and an inlet of the brew chamber 34. The fluid delivery system 44 additionally includes a heating mechanism 48 operable to heat the water supplied from the reservoir 32 to a desired temperature prior to delivery to the brew chamber 34. In the illustrated, non-limiting embodiment, the heating mechanism 48 is a flow through heater or boiler configured to heat water within an adjacent fluid supply line 46 as it passes through the heating mechanism 48 for example. However, it should be understood that any suitable type of heating mechanism 48, such as a heating mechanism including a cavity for retaining a quantity of water and a heating element (not shown) for heating the water retained within the cavity for example, may be included in the fluid delivery system 44.

In an embodiment, the heating mechanism 48 may be used to selectively deliver fluid from the reservoir 32 to the brew chamber 34. However, in other embodiments, the fluid delivery system 44 may further include a pumping mechanism 50 operable to provide a positive pumping action to push or draw a fluid, such as water for example, from the reservoir 32 through the at least one fluid supply line 46 and deliver the fluid to the brew chamber 34. In such embodiments, the fluid delivery system 44 may include a first fluid supply line 46a extending between the reservoir 32 and the pumping mechanism 50, and a second fluid supply line 46b connecting the downstream end of the pumping mechanism 50 to the brew chamber 34. In addition, in an embodiment, the heating mechanism 48 may be disposed generally between the pumping mechanism 50 and the brew chamber 34 relative to the fluid flow path defined by the at least one fluid supply line 46. However, a fluid delivery system 44 having any number of fluid supply lines 46 and any configuration of the one or more fluid supply lines 46 is contemplated herein. Further, any suitable type of pumping mechanism 50, including but not limited to a gear pump, peristaltic pump, piston pump, wave pump, and diaphragm pump for example, are within the scope of the disclosure.

The pumping mechanism 50 may be operable for a fixed period of time to supply a predetermined amount of fluid to the heating mechanism 48, and therefore the brew chamber 34, based on the one or more parameters, such as size for example, of the beverage being prepared. Alternatively, or in addition, a flow meter 52 may be associated with the fluid delivery system 44 and used to monitor the amount of fluid that passes there through. The flow meter 52 may be located between the reservoir 32 and the pumping mechanism 50, as shown in FIG. 3, or alternatively, at another location within the fluid delivery system 44, such as between the heating mechanism 48 and the brew chamber 34, as shown in FIG. 4. The amount of fluid that passes through the flow meter 52 may represent the amount of fluid provided to the brew chamber 34. Various types of flow meters 52 are within the scope of the disclosure.

With continued reference to FIG. 4, the beverage brewing system 20 may additionally include a user interface 54 for receiving one or more inputs from a user. In the illustrated, non-limiting embodiment of FIGS. 5 and 6, the user interface 54 is formed at a portion of the housing 24, such as at a surface that defines the end 64 of the second support member 30 adjacent the brew chamber 34. However, embodiments where the user interface 54 is arranged at another location about the housing 24, such as a side of the housing 24 adjacent the reservoir 32 for example, are also contemplated herein. In an embodiment, the user interface 54 may include one or more buttons, knobs, or other control input devices 56. Alternatively, or in addition, the user interface 54 may include a touch screen, or may be configured to receive an input via from a smart device, such as a phone or tablet for example, via an "app" or other suitable connection.

One of the input devices 56 may be used to select one of a plurality of sizes associated with a beverage to be brewed for example. In an embodiment, these sizes of beverages to be brewed may be based on a size of the container for receiving the brewed beverage. For example, the selectable brew sizes may include one or more of a first size associated with a mug (between about 6 and about 10 ounces), a second size associated with an extra-large mug (between about 8 and about 12 ounces), a third size associated with a travel mug (between about 12 and about 16 ounces), a fourth size associated with an extra-large travel mug (between about 16 and about 24 ounces), a fifth size associated with a half-carafe (between approximately 24 and 34 ounces), and a sixth size associated with carafe (between about 44 and about 54 ounces). The user interface 54 may additionally include an input device 56 for selecting a type of beverage to be brewed, such as coffee or tea (teas may include black, herbal, oolong, white, green, and delicate), and/or for selecting a brew style, such as classic, rich, over ice, cold brewed, and specialty. It should be understood that the various inputs described herein are intended as an example only, and that other selectable parameters and options within the disclosed parameters are also within the scope of the disclosure. Further, the brew size and type of beverage to be brewed may be selected via the same input device 56 or separate input devices 56.

With further reference to FIG. 4, operation of the beverage brewing system 20 is controlled by a controller 58 operably coupled to the pumping mechanism 50, the flow meter 52, the heating mechanism 48, and in some embodiments the pressure source 42 and steeping valve, in response to one or more input signals received from the user interface 54. The controller 58 may include one or more of a microprocessor, microcontroller, application specific integrated circuit (ASIC), or any other form of electronic controller known in the art. In an embodiment, the system 20 includes one or more temperature sensors, such as located adjacent the reservoir 32 and/or at the inlet and/or the outlet of the heating mechanism 48 for example, for measuring the temperature of the fluid within the fluid delivery system 44. The controller 58 may be configured to control operation of the fluid delivery system 44 to ensure that the heating mechanism 48, and therefore the water provided to the brew chamber 34, has a desired temperature.

As previously described, the beverage brewing system 20 may be suitable for use with several different types of flavorants, including both coffee and tea for example. Further, the beverage brewing system 20 may be suitable for use with flavorants provided in a plurality of different formats. With reference now to FIGS. 5-24B, in an embodiment, the receptacle of the beverage brewing system 20 includes a first brew chamber 34a sized and positionable to receive a flavorant in a first format and a second brew chamber 34b sized and positionable relative to the housing 24 to receive a flavorant in a second format. In an embodiment, the first brew chamber 34a is configured to receive a loose configuration of a flavorant, such as coffee grinds or tea leaves. Accordingly, the first brew chamber 34a may also be configured to receive a disposable or permanent filter (not shown) such as commonly used in conjunction with a loose flavorant during a beverage brewing process. In an embodiment, the second brew chamber 34b is configured to receive a prepackaged cartridge of flavorant. The term "cartridge" as used herein is intended to encompass any capsule, pod, sachet, wrapper or other container or case containing a material suitable for use with a beverage brewing system 20.

Figure 5:
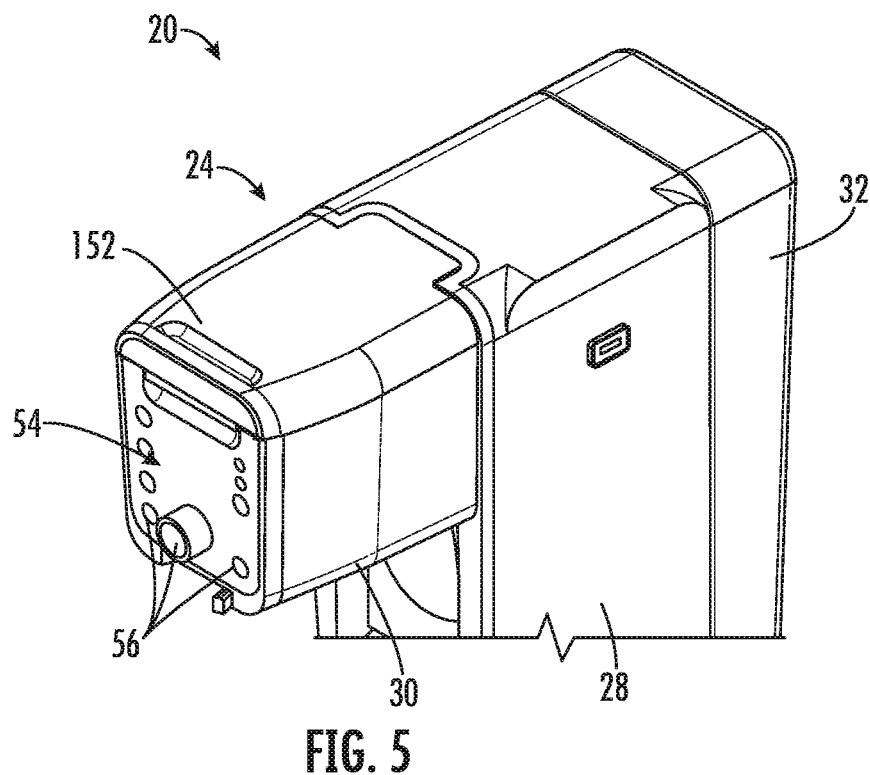
FIG. 5 is a perspective view of a beverage brewing system according to an embodiment.
Figure 6:
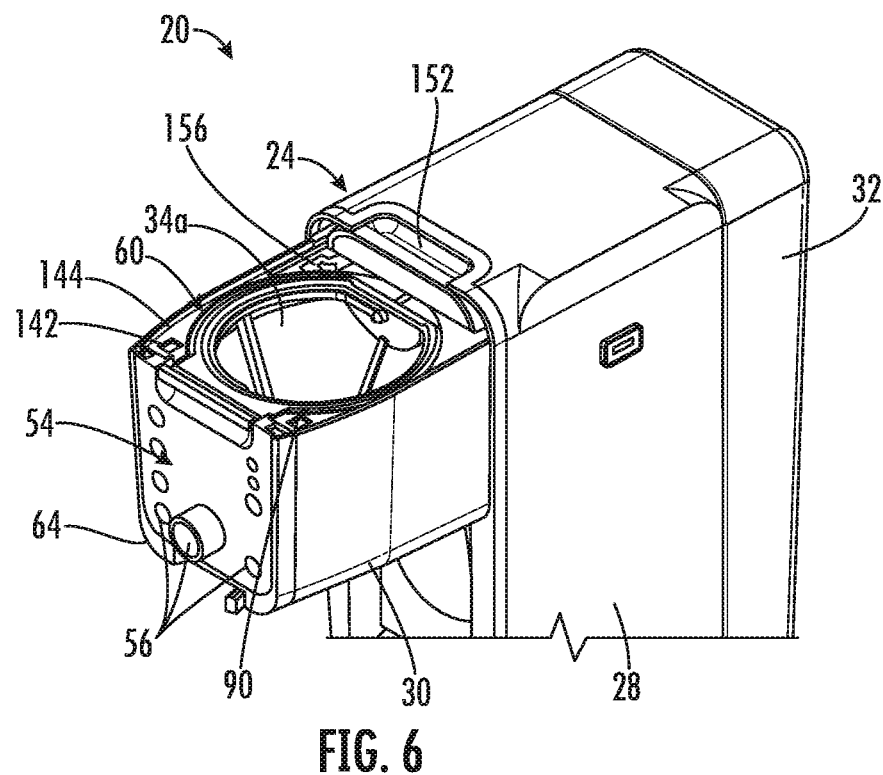
FIG. 6 is a perspective view of a beverage brewing system when the movable door is in an open position according to an embodiment.
Figure 15:
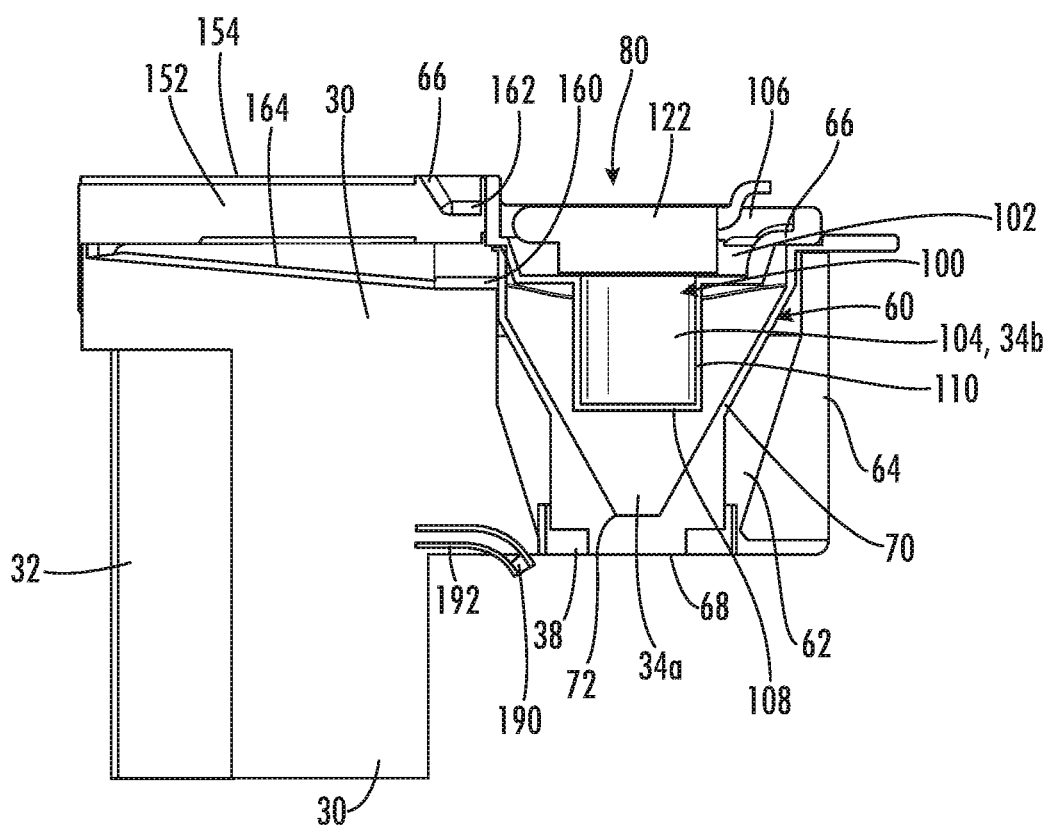
FIG. 15 is a cross-sectional view of a beverage brewing system having an adapter connected to the housing according to an embodiment.
Figure 16:
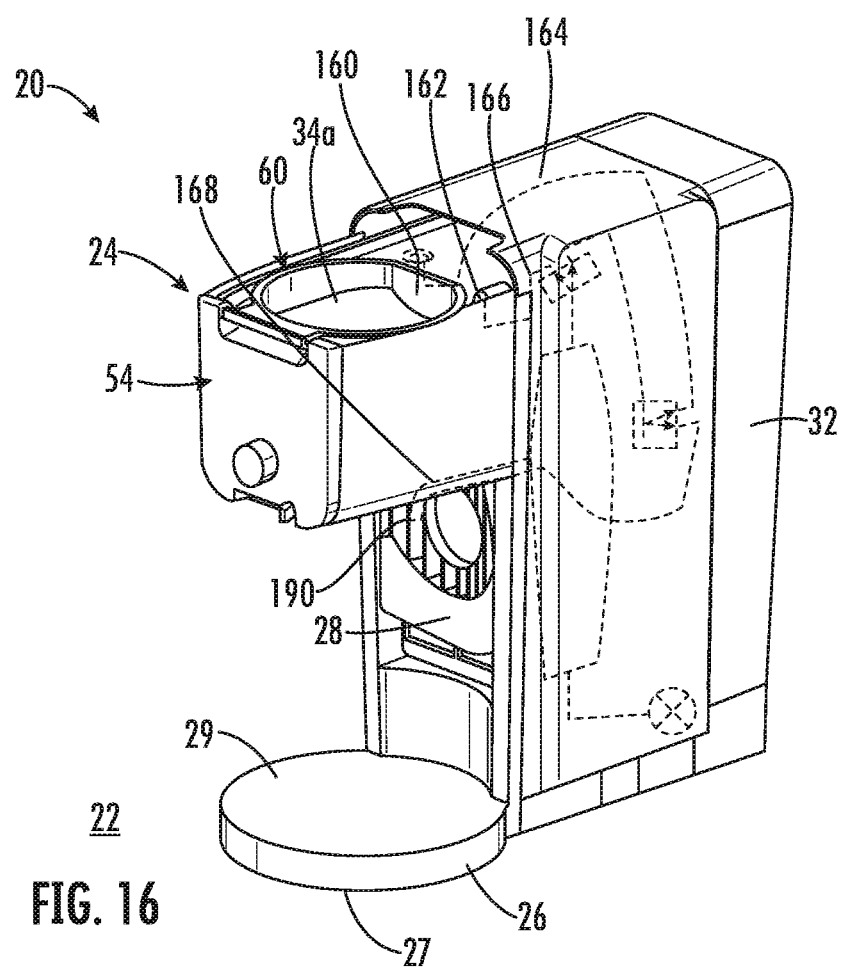
FIG. 16 is a perspective view of a beverage brewing system indicating one or more fluid supply conduits according to an embodiment.
Figure 17A:
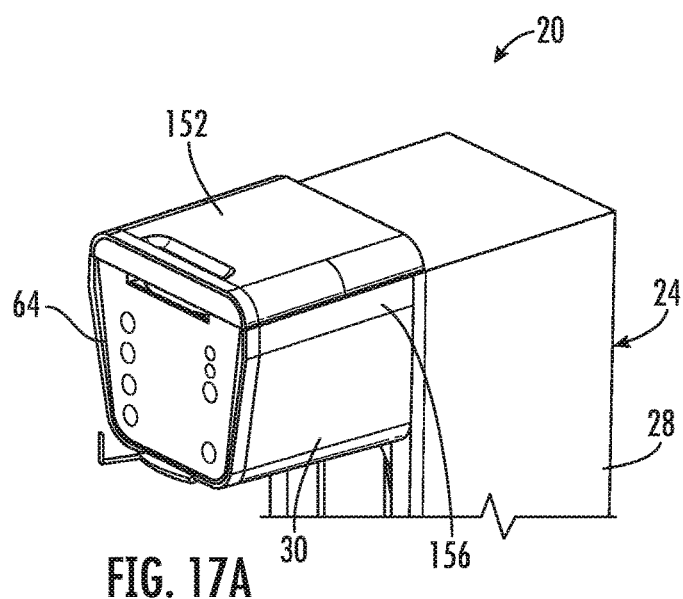
FIG. 17A is a perspective view of a beverage brewing system having a movable door in a closed position according to an embodiment.
Figure 17B:
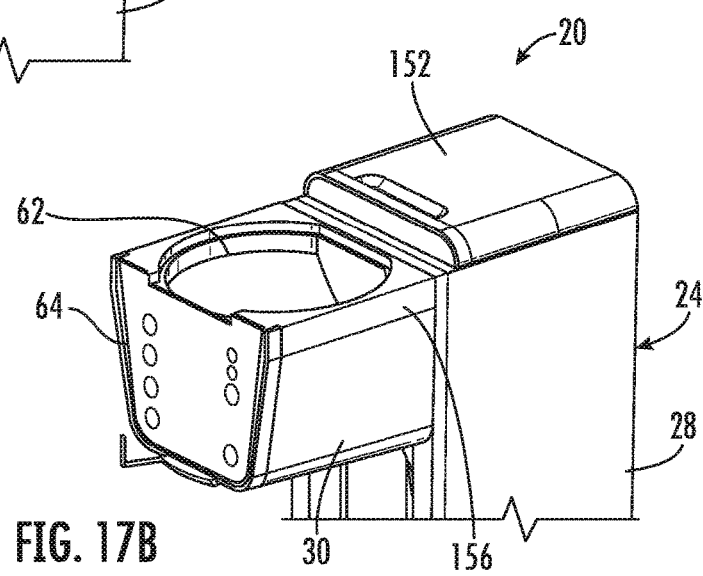
FIG. 17B is a perspective view of a beverage brewing system of FIG. 17A having a movable door in an open position according to an embodiment.
Figure 18:
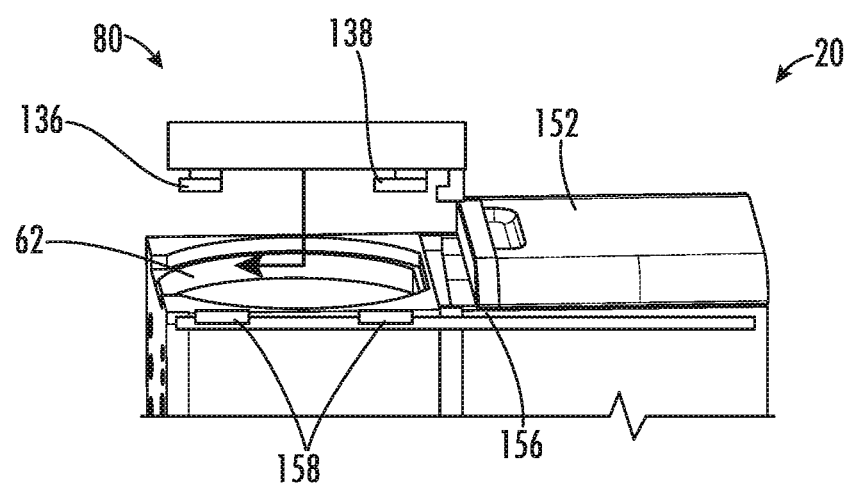
FIG. 18 is a perspective view of an adapter for use with the beverage brewing system of FIGS. 17A-17B according to an embodiment.

With specific reference to FIGS. 5-7, in an embodiment, the receptacle 33 includes a generally hollow brew basket 60 permanently or removably mountable within a cavity 62 (see FIG. 13-15) formed near the end 64 of the second support member 30. As best shown in FIG. 15, the brew basket 60 has a first end 66, a second, opposite end 68, and at least one sidewall 70 extending between the first end 66 and the second end 68 to define a first brew chamber 34a within the interior of the brew basket 60. As shown, the first end 66 of the brew basket 60 is generally open, and the second end 68 of the brew basket 60 is generally closed, having only an opening 72 formed therein. When the brew basket 60 is arranged within the cavity 62, the opening 72 is aligned with the opening 38 formed in the second support member 30 of the housing 24. A cross-sectional area of the first brew chamber 34a defined by the brew basket 60 may gradually decrease from the first end 66 to a second end 68 of the brew basket 60. In an embodiment, the shape of the cross-sectional area of the brew basket 60 may remain generally circular over the height of the brew basket 60 such that the first brew chamber 34a is generally frustoconical in shape. However, in other embodiments, the shape of the cross-sectional area of the first brew chamber 34a may vary over the height of the brew basket 60.

With reference to FIGS. 8-24B, in an embodiment, the receptacle 33 of the system 20, alternatively, or additionally includes an adapter 80 configured to removably couple to the second support member 30 of the housing 24 adjacent the cavity 62, or to the first end 66 of the brew basket 60. The adapter 80 includes a housing 82 having a cavity 84 formed therein. As shown, the cavity 84 has a first open end 86, a second generally closed end 88 and at least one sidewall 90 extending there between. The size and contour of at least a portion of the cavity 84 is selected to receive a cartridge containing a flavorant therein. As a result, the portion of the cavity 84 configured to receive a cartridge is also referred to herein as a "cartridge chamber" and defines the second brew chamber 34b. In an embodiment, the cavity 84 is sized to receive a large cartridge, such as a K-cup for example. However, in an embodiment, a smaller cartridge, such as a Nespresso cartridge for example may be suitable for use within the cavity 84 when used in combination with a sizing adapter (not shown) arrangeable within the cavity 84.

Figure 9A:
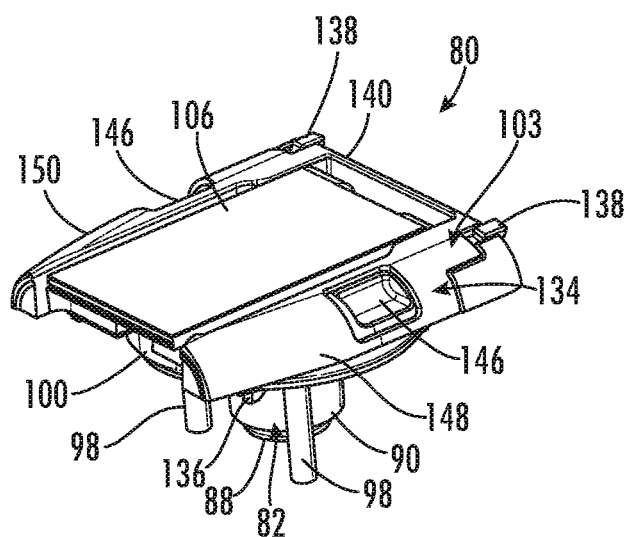
FIG. 9A is a perspective view of an adapter for use with the beverage brewing system in a closed configuration according to an embodiment.
Figure 9B:
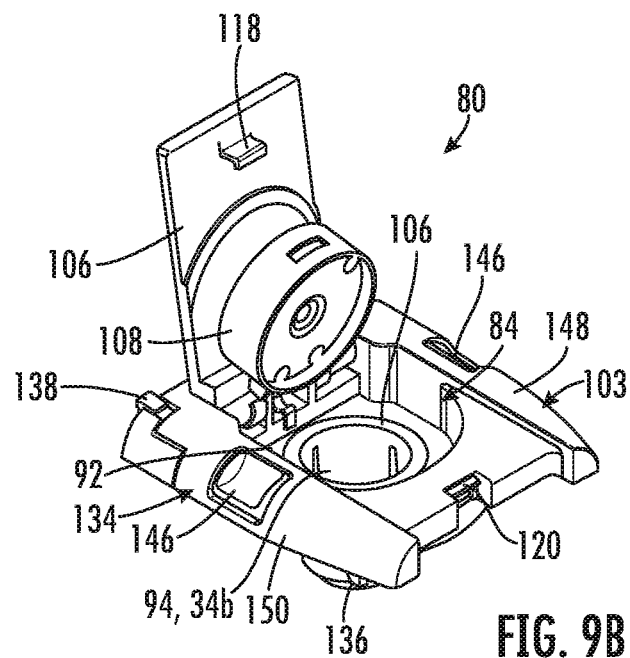
FIG. 9B is a perspective view of an adapter for use with the beverage brewing system in an open configuration according to an embodiment.
Figure 9C:
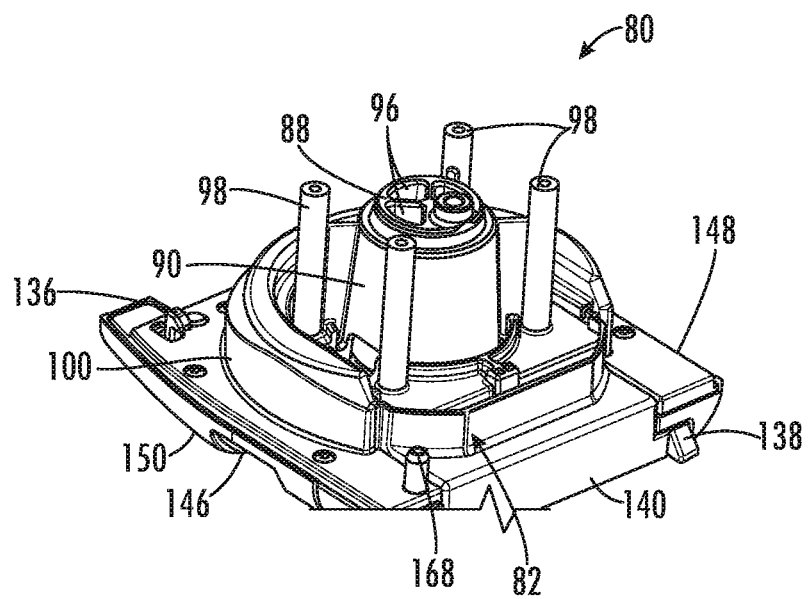
FIG. 9C is a bottom perspective view of an adapter for use with the beverage brewing system according to an embodiment.

In the non-limiting embodiment of FIG. 8A-8B, the size and shape of the overall cavity 84 is complementary to a cartridge receivable therein. However, in another embodiment, as shown in FIGS. 9-13, the cavity 84 includes a first portion 92 and a second portion 94, the second portion of the cavity 84 being configured to receive a cartridge. As best shown in FIGS. 9B and 11A, a diameter of the first portion 92 may be substantially larger than a diameter of the second portion 94 of the cavity 84. However, embodiments, where the diameters are generally equal, or where the diameter of the first portion 92 is less than the diameter of the second portion 94 are also contemplated herein. In embodiments where the cavity 84 includes a distinct first portion 92 and second portion 94, the first portion 92 of the cavity 84 is disposed adjacent the first end 86, and the second portion 94 of the cavity 84 is arranged adjacent the second end 88.

One or more openings 96 are formed at the second end 88 of the cavity 84. When the adapter 80 is mounted to the housing 24, the cavity 84 is receivable within the cavity 62 formed in the second support member 30 and the one or more openings 96 are generally aligned with the opening 38. In an embodiment, the brew basket 60 is installed within the cavity 62 when the adapter 80 is mounted to the housing 24. Accordingly, the cavity 84 of the adapter 80, and therefore the second brew chamber 34b, is receivable within the first brew chamber 34a. In such embodiments the at least one opening 96 of the adapter 80 is in fluid communication with the opening 72 of the brew basket 60 and the opening 38 of the cavity 62 formed in the housing 24.

Further, the housing 82 of the adapter 80 may include one or more support posts 98 disposed adjacent the cavity 84 and extending generally parallel to an axis of the cavity 84. In the non-limiting embodiment of FIGS. 9A-9C, the adapter 80 includes a plurality of support posts 98 arranged about an outer periphery of the sidewall 90 of the cavity 84. The support posts 98 may be used to properly position the cavity 84 of the adapter 80 relative to the opening 72 formed in the brew basket 60, such as by contacting an interior surface of the brew basket 60 for example. The adapter 80 may additionally include a gasket 100 operable to seal the first end 66 of the brew basket 60.

The adapter 80 may additionally include a lid 102 movable relative to the adapter housing 82 to seal the cavity 84 and in some embodiments, may include a casing 103 arranged adjacent to an upper surface 104 of the adapter housing 82. In embodiments where the adapter 80 includes a casing 103, the casing 103 and the upper surface 104 of the adapter housing 82 may cooperate to define a chamber within which the lid 102 is receivable when in a closed position. Further, the casing 103 may be integrally formed with the adapter housing 82, or alternatively, may be a separate component connected thereto. In instances where the casing 103 is a separate component, the adapter housing 82, and therefore the lid 102 coupled to the adapter housing 82, may be permanently or movably coupled to the casing 103.

In an embodiment, the lid 102 is pivotal about a horizontally extending axis between an open position and a closed position to selectively seal the first end 86 of the cavity 84. In the non-limiting embodiment of FIGS. 8A-8B, when in the closed position, a portion of the lid 102 is positioned adjacent to, and in some embodiments, in contact with, an upper surface 104 of the adapter housing 82 adjacent to the cavity 84. With reference now to FIGS. 9A-12, in another embodiment, such as in embodiments where the cavity 84 includes a first portion 92 and a second portion 94, the lid 102 includes a primary lid 106 and a secondary lid 108. However, embodiments where the cavity 84 includes a first portion 92 and a second portion 94, and the lid 102 includes only a single portion, such as the primary lid 106 for example, are also contemplated herein. The primary lid 106 is movable relative to the adapter housing 82 between an open position and a closed position to cover the first end 86 of the cavity 84. The secondary lid 108 is movable relative to the primary lid 106 and the adapter housing 82 between and open position and a closed position. The secondary lid 108 is disposed generally between the primary lid 106 and the cavity 84, and when in the closed position, is located directly above the cartridge chamber, for example within the first portion 92 of the cavity 84.

The portion of the lid 102 in overlapping arrangement with the first end 86 of the cavity 84, or alternatively, positioned directly adjacent the cartridge chamber, such as the secondary lid 108 for example, may be configured as a fluid input operable to receive heated water from the fluid delivery system 44 and deliver the heated water to the flavorant within a cartridge positioned within the second brew chamber 34b. In an embodiment, the portion of the lid 102 operable to seal the cartridge chamber additionally includes at least one needle 110 or other device configured to pierce or puncture a lid of a cartridge 198 located within the second brew chamber 34b. Rotation of the lid 102 to the closed position forces the needle 110 into engagement with the cartridge.

Figure 24A:
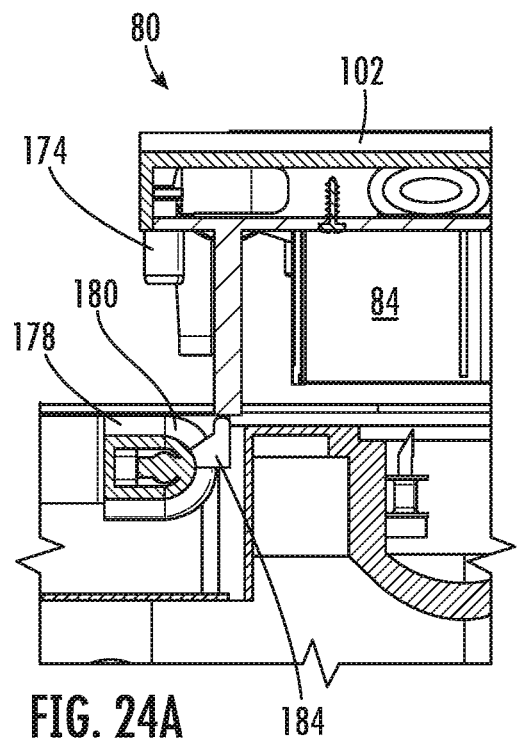
FIG. 24A is a perspective view of a connector of a beverage brewing system in a first configuration according to an embodiment.
Figure 24B:
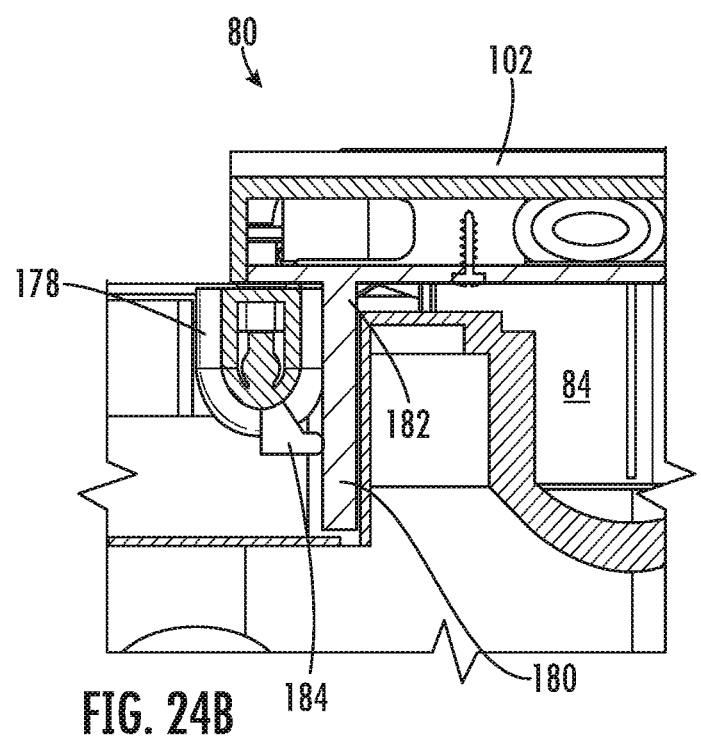
FIG. 24B is a perspective view of the beverage brewing system of FIG. 24A with the connector in a second configuration according to an embodiment.
Figure 25:
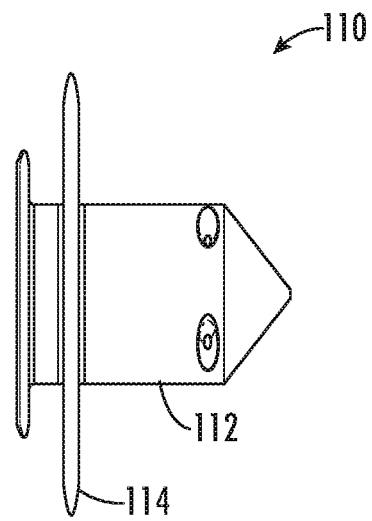
FIG. 25 is a plan view of a needle for use in an adapter of the beverage brewing system according to an embodiment.

With reference now to FIGS. 24 and 25, an example of a needle suitable for use with the system 20 is illustrated in more detail. As shown, the needle 110 is generally hollow and includes one or more openings used to distribute the fluid from the lid 102 to the flavorant F within the second brew chamber 34b. Although the needle 110 is shown in the FIGS. as having a generally conical end for insertion into the cartridge, embodiments where the needle has another shape, such as a slanted end (where the pointed edge is formed at a side of the needle rather than at the center) or a frusto-conical shape for example, are also contemplated herein. In the illustrated, non-limiting embodiment of FIG. 24, the needle 110 includes a plurality of substantially identical openings 112 spaced about a periphery of the needle body, near the pointed piercing end 114. For example, the needle 110 may be a single needle arrangeable at the center of the cavity 84 when the lid 102 is closed and having four equidistantly spaced circular openings 112. The openings 112 may be optimized to provide the greatest flow area without comprising the structural integrity of the needle 110. Although it is suggested that the needle 110 may have four openings, it should be understood that a needle 110 having any suitable number of openings 112, such as a single opening, two openings, three openings, five openings or more is within the scope of the disclosure.

Figure 26:
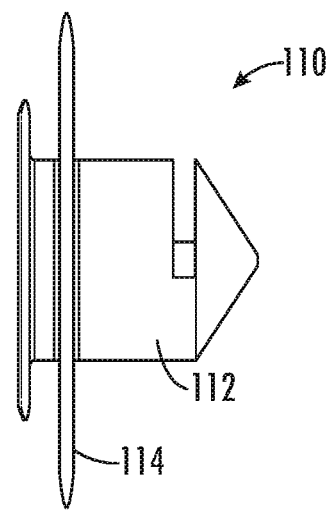
FIG. 26 is a plan view of a needle for use in an adapter of the beverage brewing system according to an embodiment.
Figure 27:
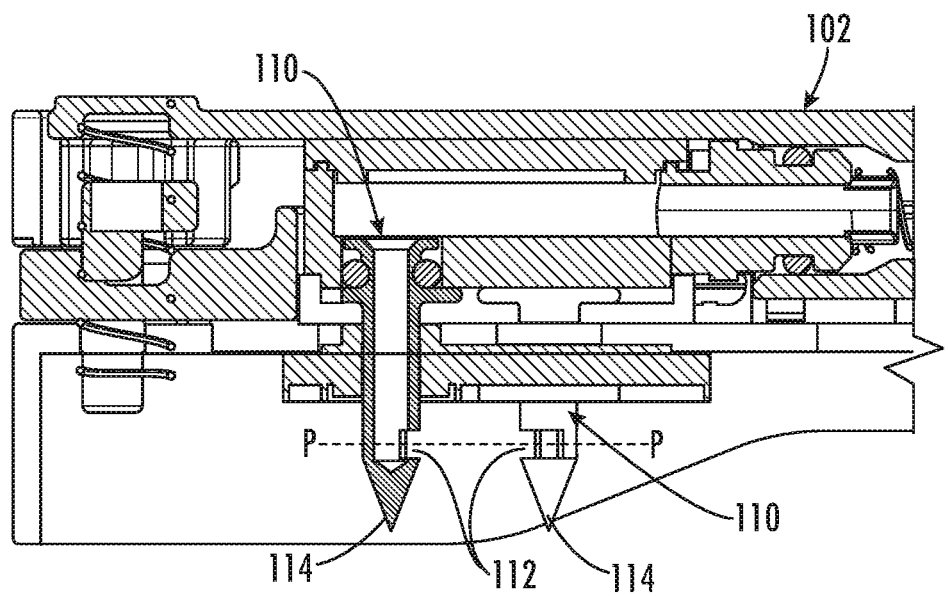
FIG. 27 is a perspective view of an adapter for use with the beverage brewing system according to an embodiment.
Figure 28:
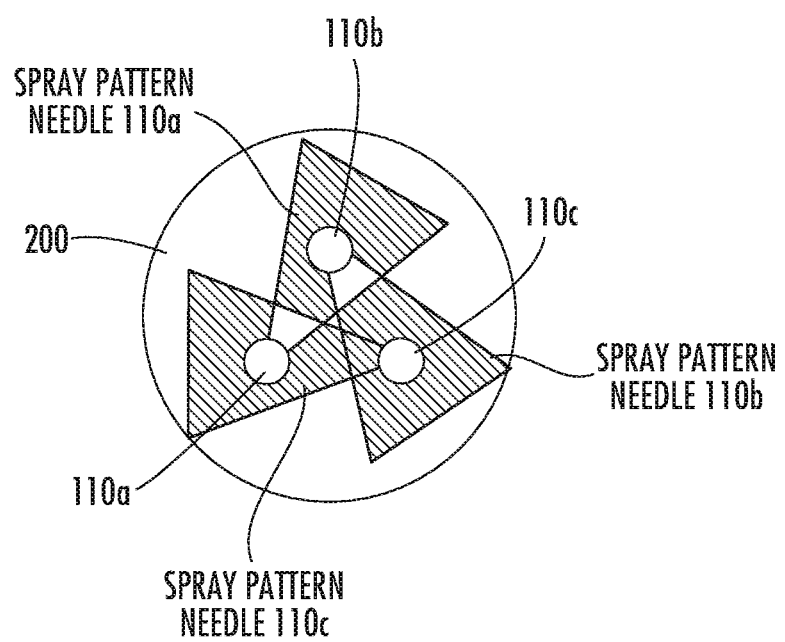
FIG. 28 is a plan view of a spray pattern of one or more needles of an adapter according to an embodiment.

In another embodiment, shown in FIG. 25, the one or more openings 112 may be one or more rectangular openings that wrap about at least a portion of the periphery of the needle body near the pointed piercing end 114. The opening 112 may wrap anywhere from 10-180 degrees of the needle body, such as 45 degrees, 60 degrees, 90 degrees or 120 degrees for example. With reference to FIG. 26, in the illustrated, non-limiting embodiment, the lid 102 includes a plurality of needles 110, such as three needles 110a, 110b, 110c for example, equidistantly spaced about a central axis of the cavity 84. As shown, a single rectangular opening 112 is formed in each of the needles 110 is substantially identical. However, any number of needles 110 having similar or different openings are contemplated herein.

One or more of the openings 112 of each of the plurality of needles 110 may be vertically aligned. In the illustrated, non-limiting embodiment, the single rectangular opening 112 formed within each needle 110a, 110b, 110c is vertically aligned with the openings 112 formed in each of the other needles such that a horizontal plane P (see FIG. 26) extends through a center of each of the openings 112.

In embodiments where the geometry of the one or more openings 112 of two or more needles is substantially identical, the geometry or shape of the spray pattern output from each opening 112, or alternatively from each needle 110, will also be substantially identical or uniform. As used herein, the term "uniform" is intended to indicate that the dimensions of the spray pattern, such as the size and shape thereof, may match one another. Further, the orientation of the uniform or matching spray patterns, may be the same, or may be different, relative to a central axis of the cavity need not be the same.

In an embodiment, the spray output from each opening of a needle 110 is consistent between operations of the system 20, such as each time water is delivered to the needle 110 for example. Further, a fluid, such as water, is configured to flow both horizontally and vertically. In view of the horizontal and vertical directional components of the flow output from the opening 112, the needles 110, 110b, 110c may be positioned and oriented within the cavity to form an overlapping spray pattern where at least a portion of the fluid output from each needle 110, 110b, 110c overlaps with at least a portion of the fluid output from one or more of the other needles 110, 110b, 110c. In the illustrated, non-limiting embodiment, the opening 112 of each needle 110a, 110b, 110c is arranged to expel a fluid such that a direction component of the fluid is aimed towards at least one of the other needles 110. For example, in the embodiment having three needles 110, 110b, 110c, the opening 112 of each needle 110a, 110b, 110c and/or the horizontal component of the flow expelled from each needle 110a, 110b, 110c is directed towards or aimed at the needle 110a, 110b, 110c located clockwise therefrom. However, the illustrated embodiment is intended as an example only, and any suitable configuration of needles 110 that generate an overlapping spray pattern is within the scope of the disclosure.

Figure 10:
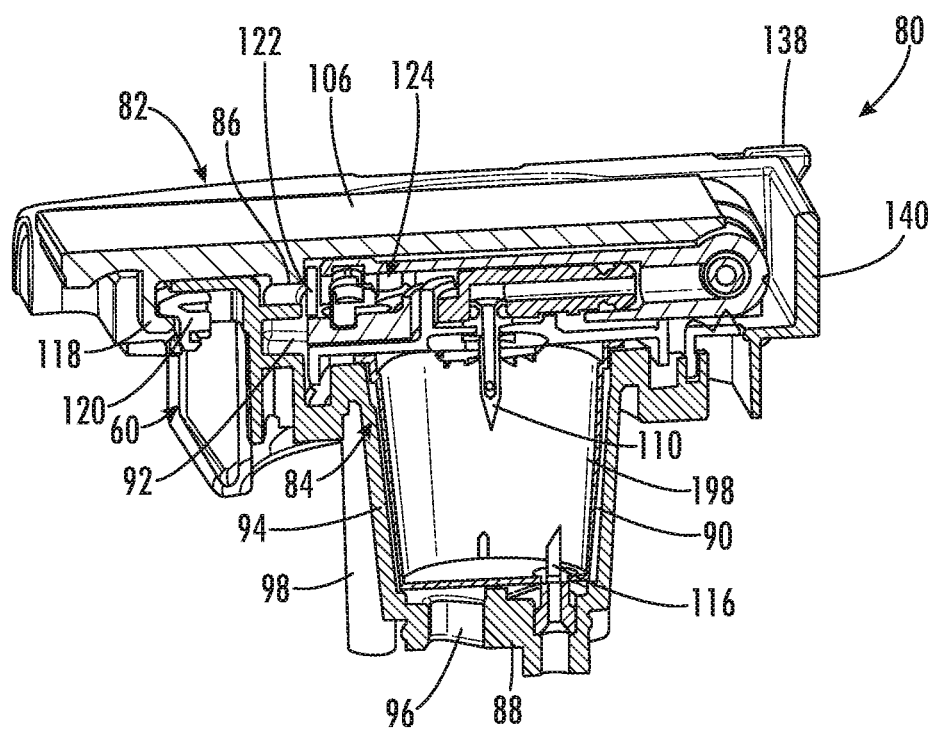
FIG. 10 is a cross-sectional view of an adapter for use with the beverage brewing system according to an embodiment.
Figure 11A:
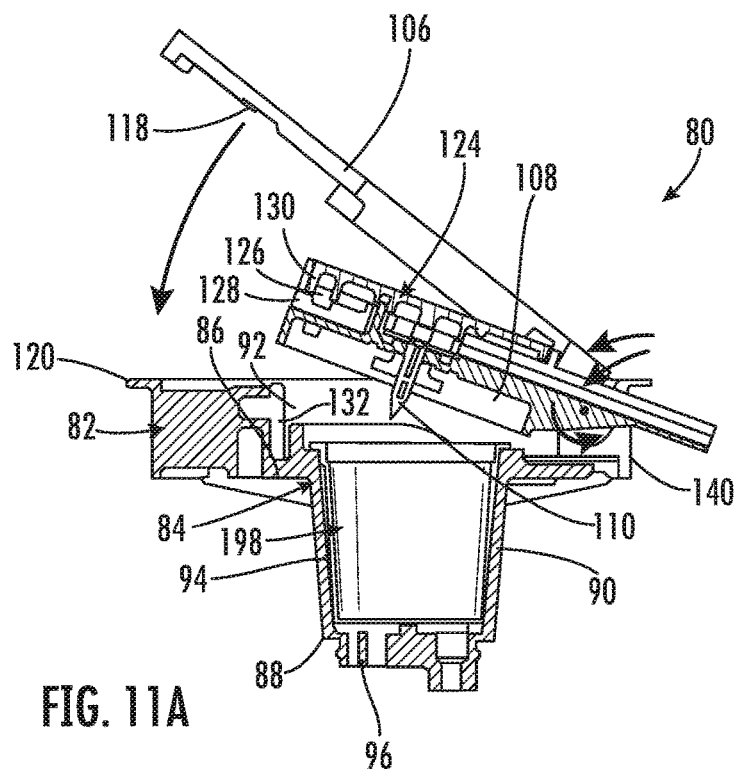
FIG. 11A is a cross-sectional view of an adapter for use with the beverage brewing system in an open configuration according to an embodiment.
Figure 11B:
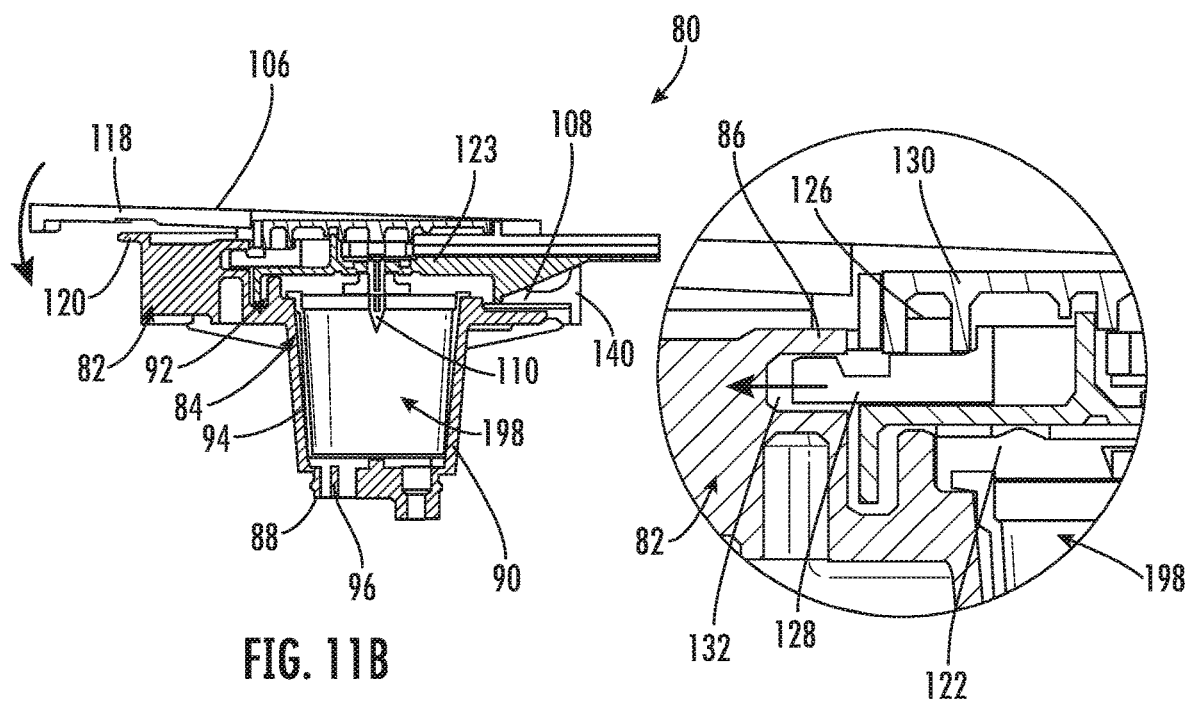
FIG. 11B is a cross-sectional view of an adapter for use with the beverage brewing system in a closed configuration according to an embodiment.
Figure 12:
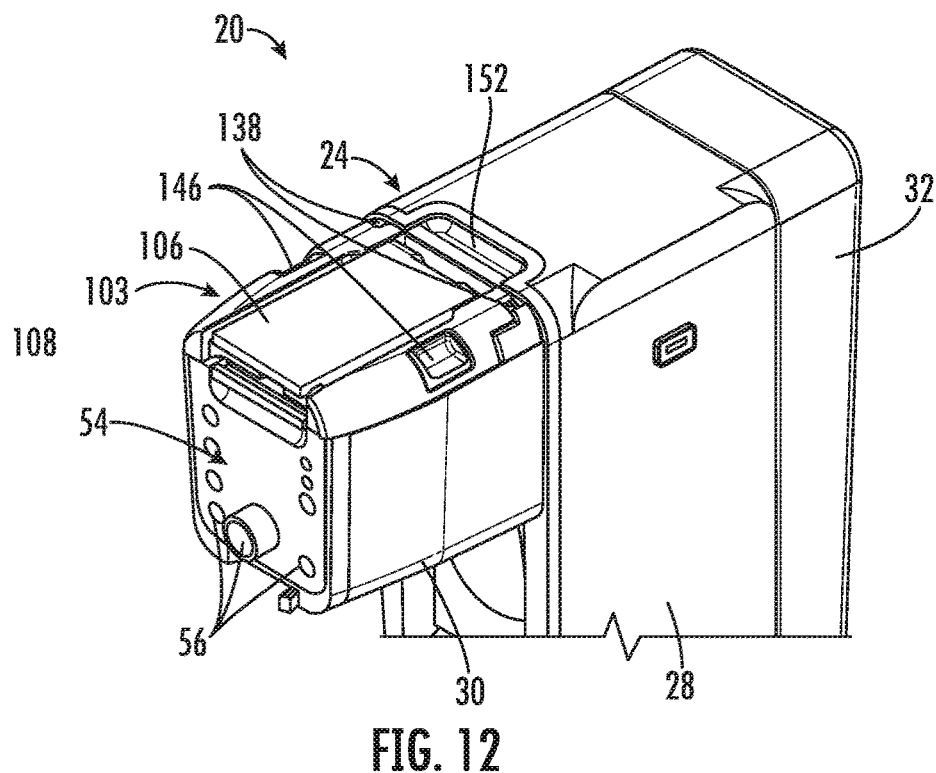
FIG. 12 is a perspective view of a beverage brewing system having an adapter connected to the housing according to an embodiment.
Figure 13:
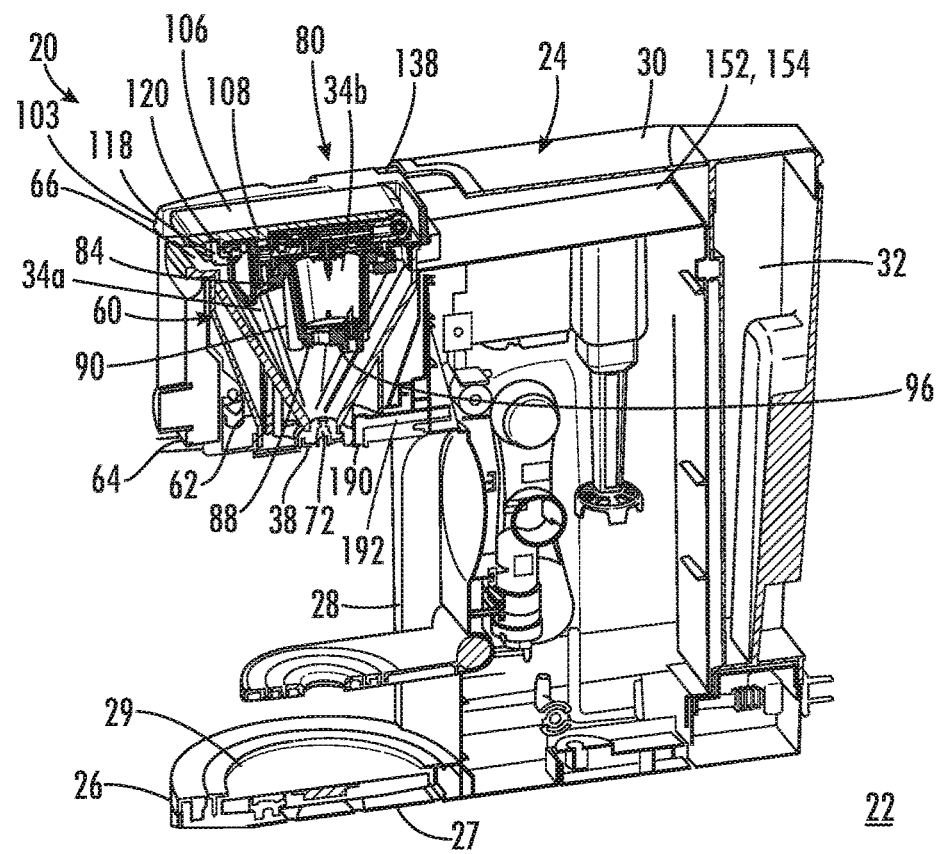
FIG. 13 is a cross-sectional view of the beverage brewing system of FIG. 12 according to an embodiment.
Figure 14:
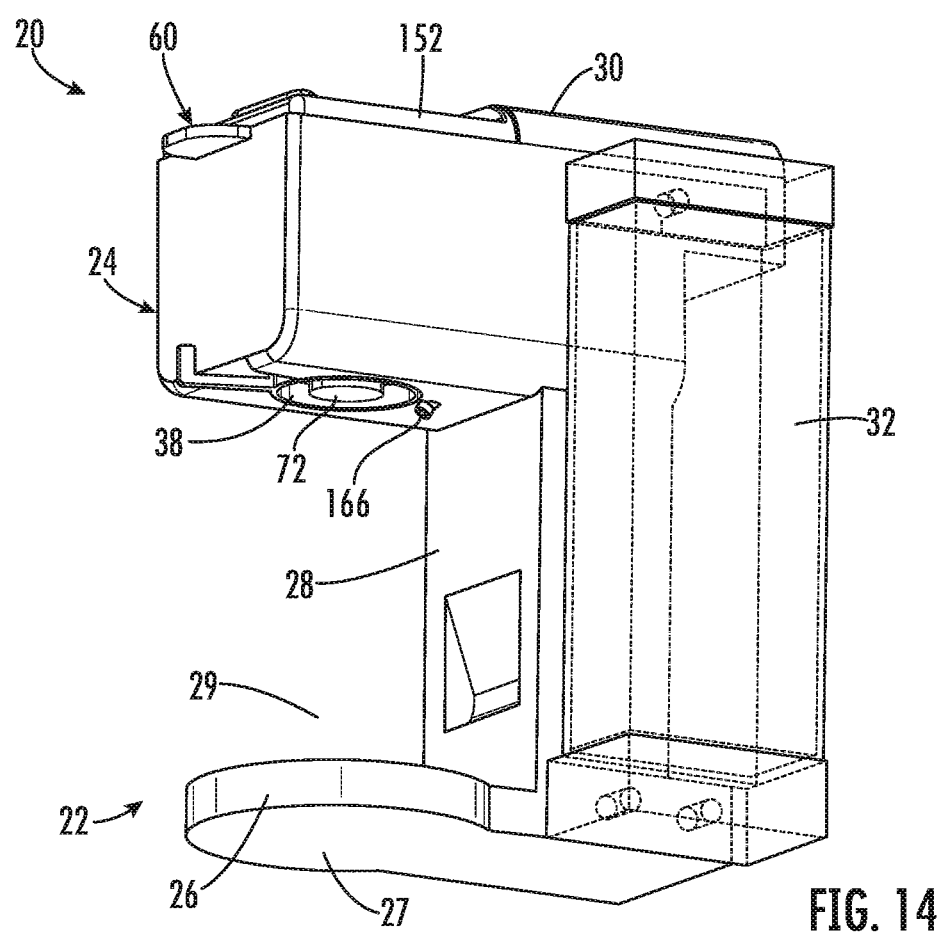
FIG. 14 is a bottom perspective view of a beverage brewing system according to an embodiment.

Further, in an embodiment, best shown in FIG. 10, one or more additional needles 116 may similarly be positioned adjacent the second end 88 of the cavity 84, within the second brew chamber 34b. Accordingly, when a cartridge 198 is installed within the cavity 84, and the lid 102 is closed, the one or more needles 116 are configured to puncture the bottom of the cartridge 198 and form one or more openings through which a flavorant infused liquid is communicated to the one or more openings 96 of the cavity 84.

In an embodiment, the lid may be selectively retained in a closed position. For example, a first feature 118, such as a tab, protrusion, or groove for example, arranged at a surface of the lid 102 is configured to couple to or engage a corresponding second feature 120 to keep the lid 102 in the closed position. In embodiments where the lid includes a primary and secondary lid 106, 108, the first feature 118 is typically formed in the primary lid 106. Although the second feature 120 is illustrated as being located at the adapter housing 82, embodiments where the second feature 120 is formed at a portion of the casing 103, the housing 24, or alternatively the brew basket 60, are also contemplated herein. Further, any suitable type of connection for selectively retaining the lid 102 in the closed position, including a push-push mechanism for example, is within the scope of the disclosure.

In an embodiment, a biasing mechanism 122 such as a spring for example, may be coupled to either the lid 102 or the adapter housing 82. In an embodiment, best shown in FIG. 8C, when the first feature 118 is engaged with the second feature 120, the biasing force of the biasing mechanism 122 may be opposed, thereby compressing the biasing mechanism 122. Accordingly, when the first feature 118 is disengaged from the second feature 120, the biasing force of the biasing mechanism 122 will cause the free end of the lid 102 to move away from the adapter housing 82. Alternatively, or in addition, a biasing mechanism (not shown) may be coupled to second feature 120.

Figure 20A:
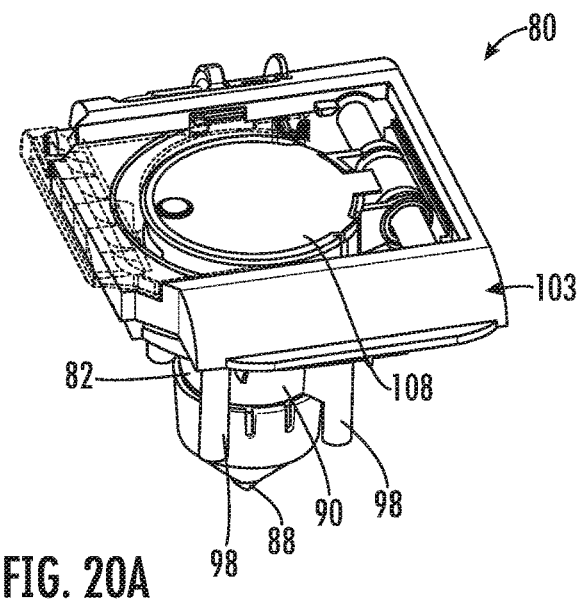
FIGS. 20A, 20B, and 20C are various perspective views of an adapter for use with the beverage brewing system according to an embodiment.
Figure 20B:
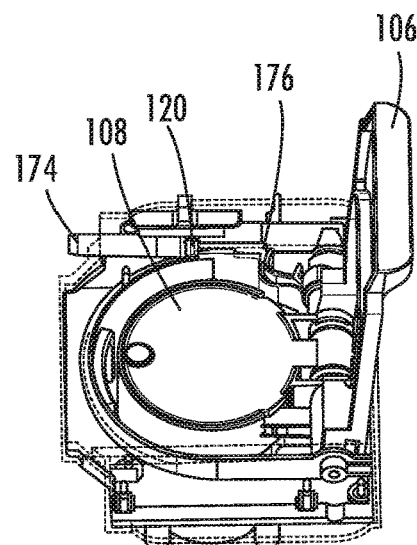
Figure 20C:
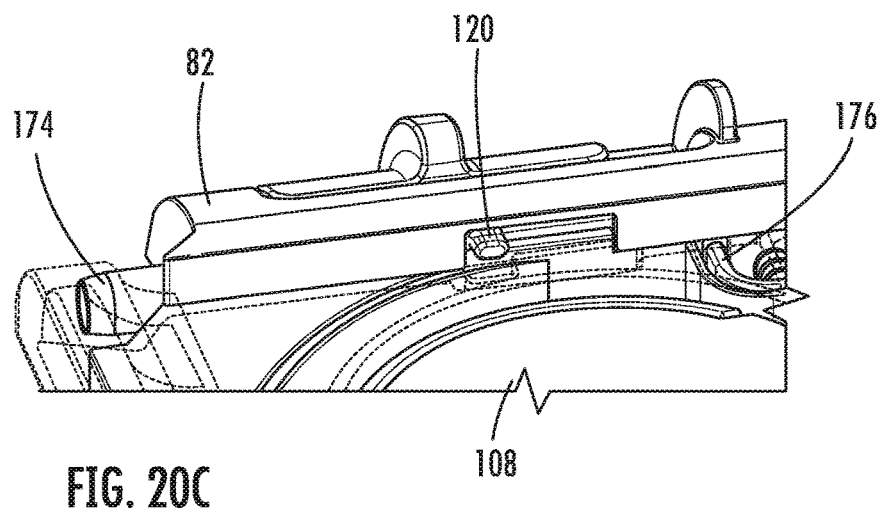
Figure 21A:
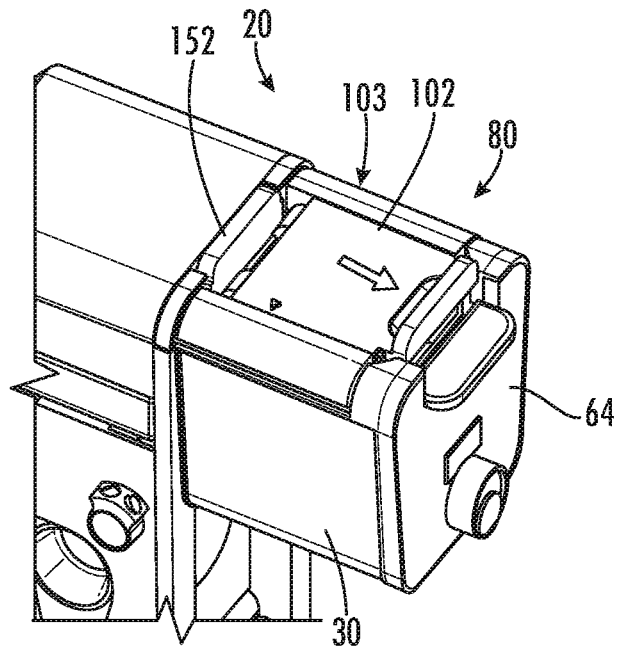
FIG. 21A is a perspective view of a beverage brewing system having an adapter connector to the housing with the lid closed and in an unlocked position according to an embodiment.
Figure 21B:
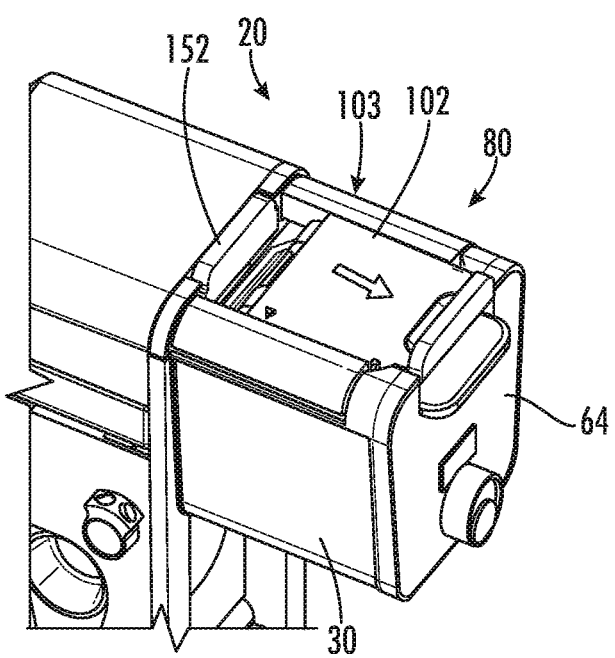
FIG. 21B is a perspective view of the beverage brewing system of FIG. 21A with the lid of the adapter in a locked position according to an embodiment.

With reference to FIGS. 20A-20C, in an embodiment, the second feature 120 is movable relative to the adapter housing 82 or casing 103 in response to application of a force by a user, such as via a handle for example. When the lid 102 is lowered, the first feature 118 formed therein is configured to engage the second feature 120 to retain the lid 102 in the closed position. To release the lid 102, the second feature 120 is moved by a user to oppose the biasing force of the biasing mechanism coupled thereto. In response to this movement, the second feature 120 disengages from the first feature 118, and the lid 102 may be manually opened or biased into the open position. Upon removal of the force from the second feature 120, the biasing member will bias the second feature 120 back into a neutral position.

In yet another embodiment, when the lid 102 is in the closed position, the first feature 118 may be movable relative to the second feature 120 to retain the lid 102 in the closed position. With reference now to FIGS. 21A-22B, in the illustrated, non-limiting embodiment, the first feature 118 includes a stationary pin and the second feature 120 includes an opening within which the pin 118 is received when the lid 102 is closed. As shown, the opening 120 is elongated such that the pin 118 is configured to translate within the opening 120 as the closed lid slides from an unlocked to a locked configuration. In another embodiment, best shown in FIG. 22C, the first feature 118 is a spring biased pin. The spring bias acting on the pin 118 allows the lid 102 to be rotated closed such that the pin 118 is receivable within the opening 120 when the lid 102 is in both the locked configuration and the unlocked configuration.

Figure 29:
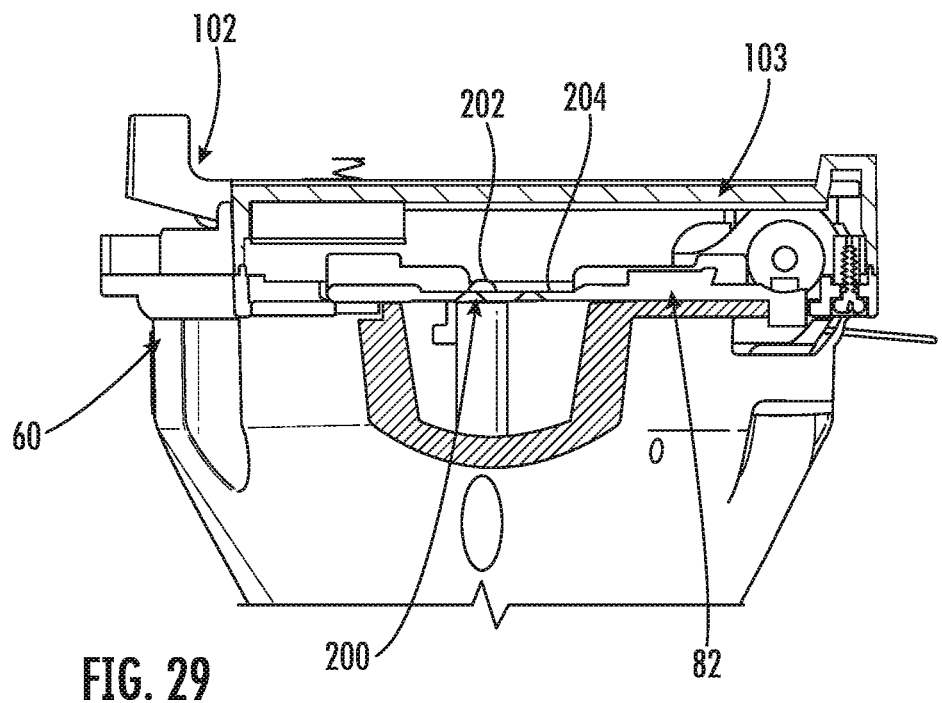
FIG. 29 is a side view of an adapter for use with the beverage brewing system according to an embodiment.

It should be understood herein that because the lid 102 is pivotally connected to the adapter housing 82, in embodiments where the lid 102 is configured to move, for example translate, between an unlocked configuration and a locked configuration, the adapter housing 82 may move in unison with lid 102 relative to the casing 103, housing 24, and/or brew basket 60. In such embodiments, a portion of the casing 103, brew basket 60, or housing 24 may be configured to cooperate with a portion of the adapter 80 to retain the lid 102 in at least the locked configuration. With respect to the embodiment illustrated in FIG. 29, as shown, a detent 200 extends upwardly from a portion of the brew basket 60 towards the adapter housing 82. The adapter housing 82 may have two complementary grooves formed therein and configured to couple to the detent 200. Accordingly, when the lid 102 is in the unlocked configuration, the detent 200 may be received within a first groove 202 and when the lid 102 is in the locked configuration, the detent 200 is received within the second groove 204. The detent 200 may be spring biased. As a result, when a force sufficient to overcome the bias of the detent 200 is applied to the lid 102, for example a force associated with an intentional movement of the lid 102, the lid 102 will overcome the biasing force of the detent 200 and move in the desired direction.

Figure 30:
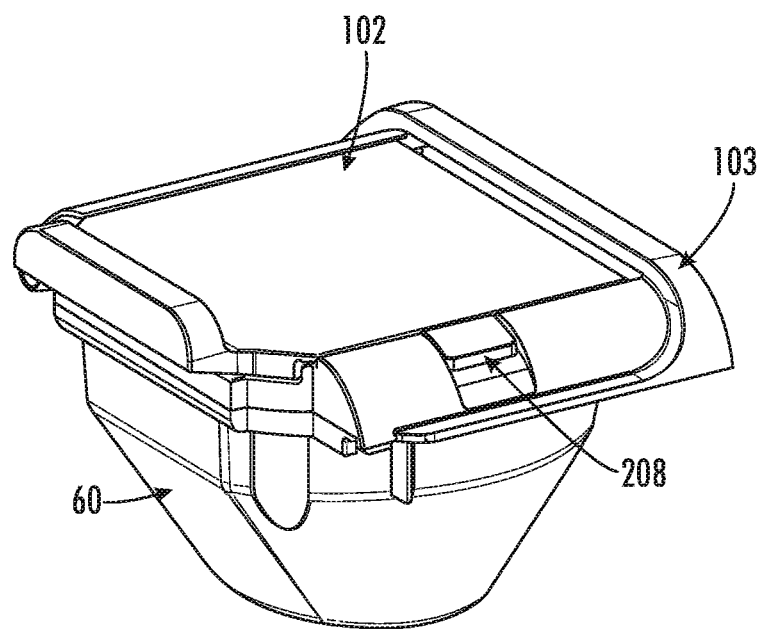
FIG. 30 is a perspective view of another adapter for use with the beverage brewing system according to an embodiment.
Figure 31:
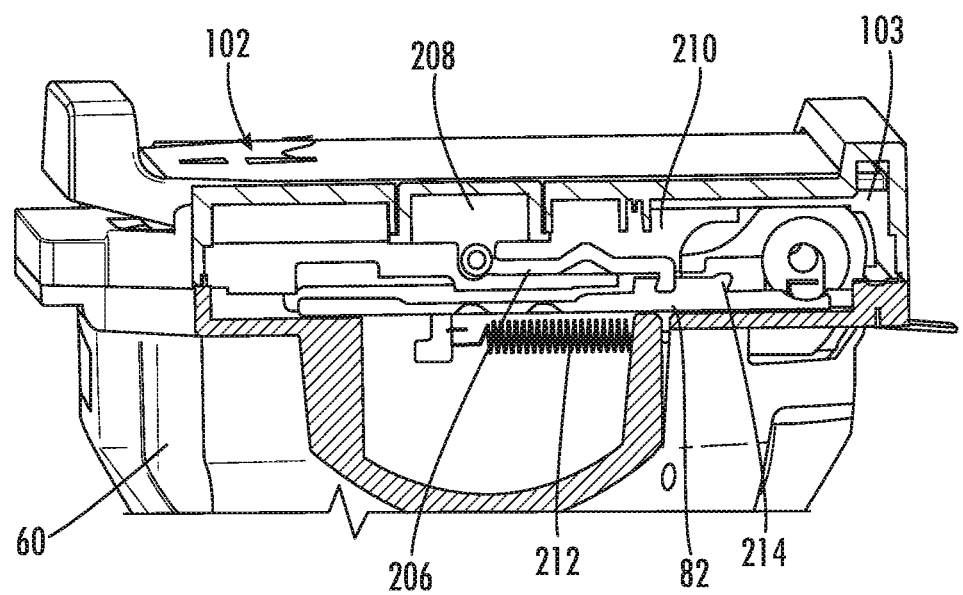
FIG. 31 is a side view of the adapter of FIG. 30 in an unlocked configuration according to an embodiment.
Figure 32:
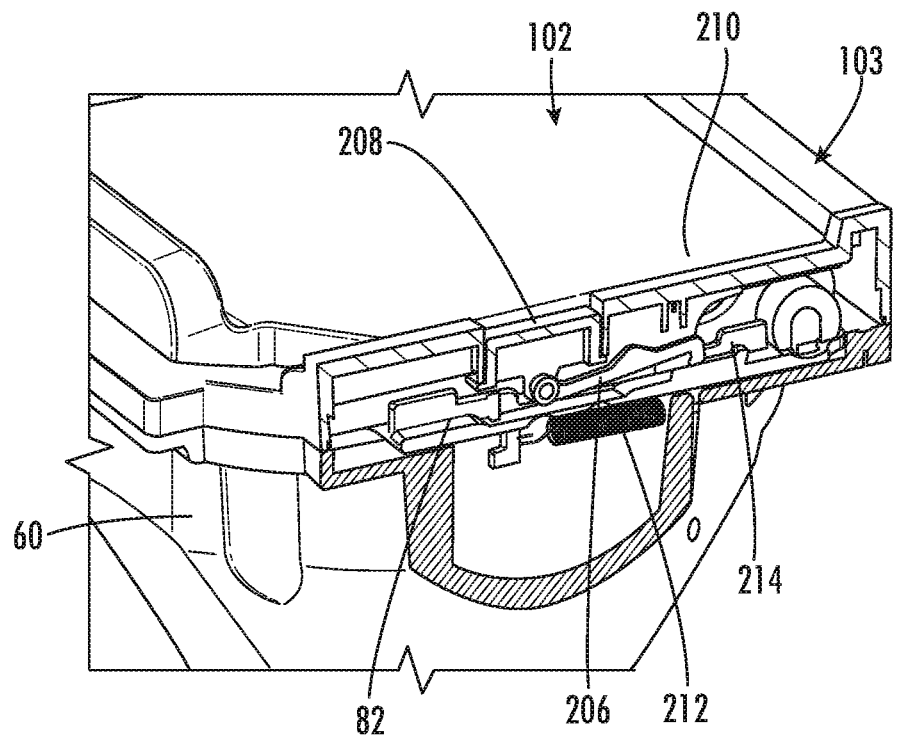
FIG. 32 is a perspective side view of the adapter of FIG. 30 in an unlocked configuration according to an embodiment.
Figure 33:
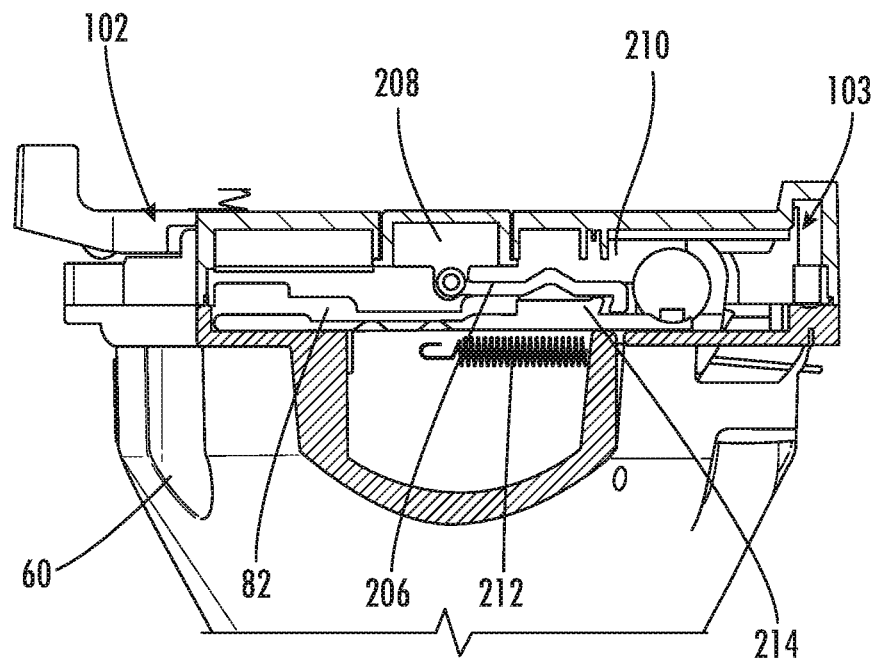
FIG. 33 is a side view of the adapter of FIG. 30 in a locked configuration according to an embodiment.
Figure 34:
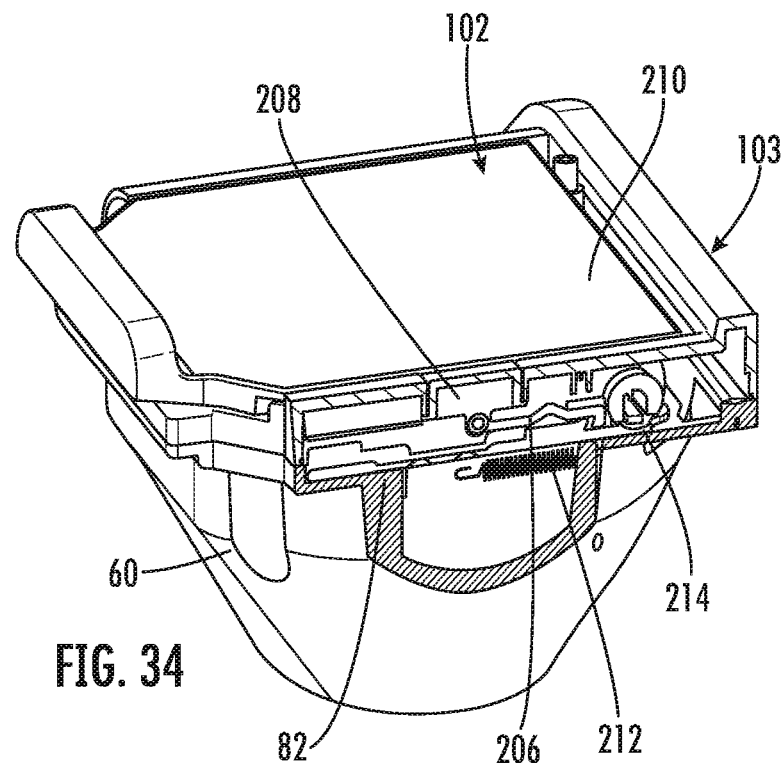
FIG. 34 is a perspective side view of the adapter of FIG. 33 in a locked configuration according to an embodiment.
Figure 35:
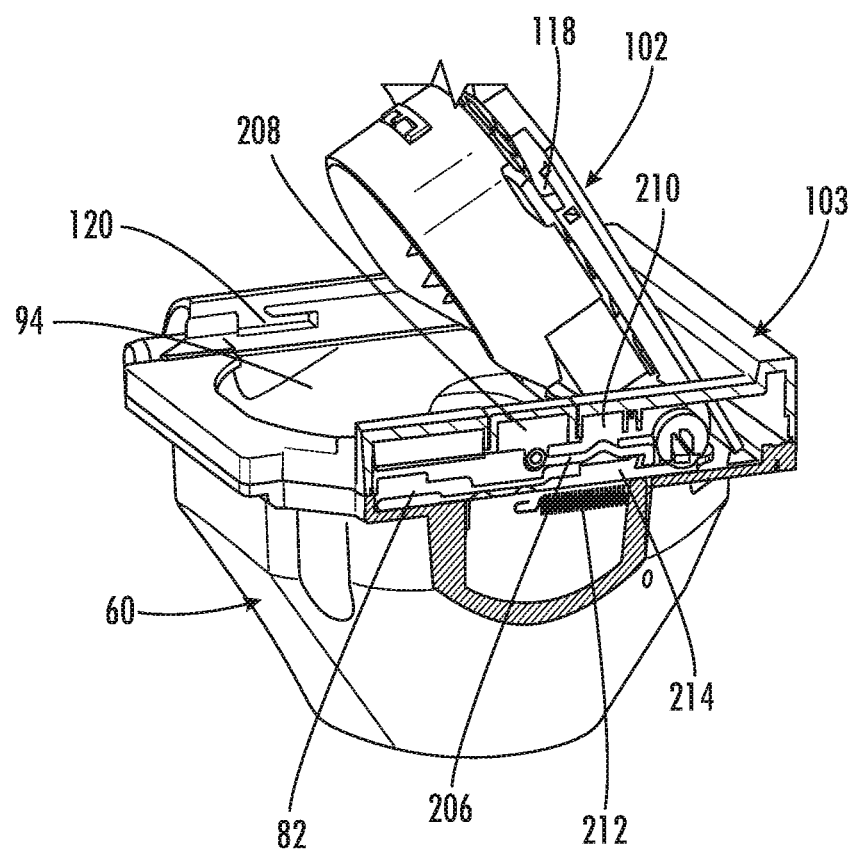
FIG. 35 is a perspective side view of the adapter of FIG. 33 in a locked configuration when the lid is open according to an embodiment.

With reference now to FIGS. 30-35, in another embodiment, the casing 103 includes a spring biased detent lever 206 coupled to a push button 208 formed in the casing 103. As shown, the free end 210 of the detent lever 206 is biased by a biasing mechanism (not shown) downward toward the adapter housing 82. Further, in an embodiment, a biasing mechanism 212 extends between the adapter housing 82 and the brew basket 60, the biasing mechanism 212 being configured to bias the adapter housing 82 and the lid 102 toward the unlocked position. As the lid 102, and therefore the adapter housing 82, is moved forward relative to the casing 103, to a locked configuration (see FIGS. 33-35), the free end 210 of the detent lever 206 is configured to engage a corresponding feature 214 formed in the adapter housing 82. This engagement between the detent lever 206 and the feature 214 defines a forward position of the lid 102 by restricting further movement of the lid 102 and the adapter housing 82 in a given direction. To move the lid 102 from the forward or locked configuration to the unlocked or rearward configuration, an operator will apply a force to the push button 208 arranged at the surface of the casing 103. Application of a force to the push button 208 will cause the detent lever 206 to rotate against the bias of the biasing mechanism to disengage from the feature 114 of the adapter housing 82. With the detent lever 206 out of the path movement of the adapter housing 82, the adapter housing 82 and the lid 102 may be biased by the biasing mechanism 212 toward the unlocked configuration (FIGS. 30-32).

In embodiments where the lid 102 includes a primary lid 106 and a second lid 108, the primary lid 106 and the secondary lid 108 may be rotatable about an axis independently and in unison. For example, the lid 102 may include a coupling mechanism 124 operable to selectively couple the secondary lid 108 to the primary lid 106. With reference now to the embodiment of the adapter 80 shown in FIGS. 11A and 11B, an example of a coupling mechanism 124 for connecting the primary and secondary lids 106, 108 is illustrated in more detail. In an embodiment, when the primary lid 106 is in a first, open position, at least a portion of the primary lid 106 and the secondary lid 108 is separated by a distance. When the primary lid 106 is rotated about an axis toward the closed position, the primary lid 106 and the secondary lid 108 are rotationally locked to one another via the coupling mechanism 124. In the illustrated, non-limiting embodiment, as the secondary lid 108 is received within the first portion 92 of the cavity 84, a pin 126 extending downwardly from a portion of the secondary lid 108 engages an adjacent surface of the adapter housing 82, causing the pin 120 to translate vertically upward. This vertical translation of the pin 126 decouples a first portion 128 of the coupling mechanism 124 associated with the secondary lid 108 from a second portion 130 of the coupling mechanism 124 associated with the primary lid 106.

Further rotation of the primary lid 106 relative to the secondary lid 108 and the adapter housing 82 causes the first portion 128 of the coupling mechanism 124 to translate outwardly into engagement with a corresponding slot or opening 132 formed in an adjacent portion of the adapter housing 82, in a manner similar to a latch, thereby locking the secondary lid 108 to the adapter housing 82. In addition, in some embodiments, as the primary lid 106 approaches the adapter housing 82, the first feature 118 formed in the primary lid 106 engages the second feature 120 formed at the adapter housing 82 to couple the primary lid 106 to the adapter housing 82. When the primary lid 106 is in the closed position and is coupled to the adapter housing 82, the primary lid 106 is arranged in contact with, such as direct contact for example, the secondary lid 108.

As the primary lid 106 is rotated open, in a direction away from the housing 82, the first portion 128 will translate inwardly into the secondary lid 108. In addition, as the secondary lid 108 moves away from the adapter housing 82, gravity will cause the pin 126 to translate to a position where the pin 126 is received within both the first portion 128 and the second portion 130, thereby coupling the first and second portions 128, 130. The mechanism 124 for coupling the primary lid 106 and the secondary lid 108 illustrated and described herein is intended as an example only, and it should be understood that any suitable coupling mechanism is within the scope of the disclosure.

In an embodiment, a contour of the adapter housing 82 is designed to cooperate with the second support member 30 of the housing 24 and/or the brew basket 60 to properly position and mount the adapter 80. Alternatively, or in addition, the adapter 80 may include a mechanism 134 operable to couple the adapter 80 to the housing 24 and/or to the brew basket 60. For example, in the non-limiting embodiment of FIGS. 9A-9B, the mechanism 134 includes at least one first engagement member 136 extending generally vertically from a bottom surface of the adapter housing 82, and at least one second engagement member 138 extending generally horizontally from a rear end 140 of the adapter housing 82 configured to abut an adjacent, for example perpendicularly oriented, surface of the housing 24.

Each first engagement member 136 is receivable within a corresponding opening 142 (best shown in FIGS. 1 and 6) formed in an upper surface 144 of the second support member 30. In an embodiment, a contour of the first engagement member 136 is configured to restrict movement of the adapter 80 relative to the housing 24 once the first engagement member 136 is positioned within the opening 142. In another embodiment, the first engagement member 136 may be configured to couple to another engagement member (not shown) extending from the housing 24 or brew basket 60, or formed within each opening 142, to affix the adapter 80 to the housing 24. Similarly, in an embodiment, a contour of the at least one second engagement member 138 may be selected to restrict movement of the adapter 80 relative to the housing 24 once the second engagement member 138 is coupled to an adjacent portion of the housing 24.

The mechanism 134 may additionally include a spring-biased plunger 146 mounted to the adapter 80 and operable to selectively retract the at least one first engagement member 136 and the second engagement member 138 to separate the adapter 80 from the housing 24. In the illustrated, non-limiting embodiment, the mechanism 134 of the adapter 80 includes a first spring-biased plunger 146 associated with a first engagement member 136 and a second engagement member 138 disposed at a first side 148 of the adapter 80, and a second spring-biased plunger 146 associated with at least one associated with a first engagement member 136 and a second engagement member 138 disposed at a second, opposite side 150 of the adapter 80. In such embodiments, the first and second spring-biased plungers 146 may be operably coupled to one another, or alternatively, may be independently operable. The mechanism 134 illustrated and described herein is intended as an example only, and it should be understood that any suitable mechanism for removably connecting the adapter 80 to the housing 24 is within the scope of the disclosure.

For example, in another illustrated in FIGS. 8A-8B, the mechanism 134 may include one or more engagement members configured to cooperate with the brew basket 60 to properly position the adapter 80. In the illustrated, non-limiting embodiment shown, the mechanism 134 includes first engagement member 136 and/or a second engagement member 138 configured to couple directly to a portion of the brew basket 60. The first and second engagement members 136, 138 may be received within corresponding openings or cavities formed in the brew basket 60, such as adjacent opposite sides of the brew basket 60 for example.

The engagement members 136, 138 may, but need not be movable relative to the adapter housing 82. For example, the first engagement member 136 may be inserted into a respective first opening, and the adapter 80 may then be rotated to facilitate insertion of the second engagement member 138 into a respective second opening. However, embodiments where at least one or the engagement members 136, 138 is movable relative to the adapter housing 82, such as in response to rotation of the lid 102 for example, are also contemplated herein.

When the adapter 80 is mounted to the housing 24, the second brew chamber 34b is used to prepare a brewed beverage, and when the adapter 80 is not mounted to the housing 24, the brew basket 60 is used to prepare a brewed beverage. The controller 58 of the system 20 may be configured to receive a signal identifying whether one or both of the brew basket 60 and the adapter 80 are coupled to the housing 24 and automatically adjust the one or more options selectable via an input of the user interface 54. In an embodiment, at least one of the brew basket 60 and the adapter 80 includes an indicator device. In such embodiments, a corresponding reader (not shown) disposed within the housing 24 generally adjacent the cavity 62 is configured to sense and/or identify the indicator device to determine which of the brew basket 60 and the adapter 80 is affixed to the housing 24. In an embodiment, the at least one indicator device is a magnetic sensor. However, it should be understood that any suitable device configured to communicate with the reader, such as a mechanical switch or plunger for example, is within the scope of the disclosure. For example, in an embodiment, the at least one device may be an RFID tag, and the reader may be an RFID reader. Further, in some embodiments, a sensor, such as a reed switch for example, may be used to detect when the lid 102 of an adapter 80 is closed and/or in a locked configuration, such as via engagement between the first feature 118 and the second feature 120 for example, such as to indicate that a beverage brewing operation may be initiated. The sensor used to identify the position of the lid 102 may be the same device, or different than the indicator device.

In an embodiment, the housing 24 of the system 20 additionally includes a door 152 movably coupled to the second support member 30 of the housing 24. When the movable door 152 is in a first, closed or extended position (FIG. 5), the door 152 is positioned adjacent the end 64 of the second support member 30, in overlapping arrangement with the cavity 62. In the closed position, the door 152 may form a pressure tight seal with the first end 66 of the brew basket 60. In an embodiment, the door 152 is translatable along an axis relative to the housing 24 to an open or retracted position (FIG. 6) to selectively expose the cavity 62. In this open position, the brew basket 60 may be removably installed within the cavity 62, and/or the adapter 80 may be mounted to the exposed upper surface 144 of the second support member 30. In an embodiment, the door 152 is configured to translate along an axis oriented substantially parallel to the longitudinal axis of the second support member 30 between the closed position and an open position. As best shown in FIG. 6, a substantial entirety, or at least a portion of the door 152 is receivable within a chamber 154 (see FIGS. 6, 7, and 12) formed in the housing 24, such as within a portion of the second support member 30 generally adjacent to the first support member 28.

However, in other embodiments, the door 152 may be located at an exterior of the housing 24 in both the closed and open positions. In the non-limiting embodiment shown in FIGS. 17A-17B, one or more rails or tracks 156 are formed in the housing 24 and at least one corresponding guide (not shown) affixed to the door 152 is engaged with the one or more rails 156, respectively. Although two rails 156 arranged at opposite sides of the second support member 30 are shown in the FIGS., it should be understood that embodiments including a single rail, and embodiments including more than two rails are also within the scope of the disclosure. In embodiments where the door 152 is configured to translate between a closed and open position via a rail or track 156, one or more of the engagement features of the mechanism 134 may be associated with the rail or track 156 to couple the adapter 80 to the housing 24. In an embodiment, the engagement members 136 may couple to the rail 156 directly. Alternatively, in the non-limiting embodiment shown in FIG. 18, a plurality of openings 158 corresponding to the engagement members are formed in the rails 156. In such embodiments, to couple the adapter 80 to the housing, the engagement members 136 are inserted into the openings 158 and may, but need not be, translated within the openings 158. This translation of the engagement member 136 may be achieved by moving the lid 102 and the adapter housing 82 relative to the casing 103 when the adapter 80 is installed to a housing 24 of the system 20. For example, the engagement members 136 may affix the adapter 80 to the housing 24 in response to transitioning the lid 102 and the adapter housing 82 from an unlocked configuration to a locked configuration.

The fluid delivery system 44 includes at least one fluid supply line for delivering water from an upstream component, such as the heating mechanism 48, to a portion of the receptacle 33. With reference now to FIGS. 13-16, the fluid delivery system 44 includes one or more fluid supply lines configured to deliver a fluid to the receptacle 33. In an embodiment, the cooking system includes a first port 160 for delivering fluid to the first brew chamber 34a of the brew basket 60, and includes a second port 162, distinct from the first port for delivering fluid to the second brew chamber 34b via the adapter 80. As shown, a first fluid supply line 164 may be arranged in fluid communication with the first port 160. In an embodiment, the first port 160 is formed vertically above, or at a sidewall 70 of the brew basket 60. Further, the movable door 152 may be configured to receive fluid from the first port 160 and deliver the fluid to the brew chamber 34a in a manner similar to a shower head. When the movable door 152 is closed and in overlapping arrangement with the brew basket 60, the shower head is positioned vertically above the end 66 of the brew basket 60 in fluid communication with the brew chamber 34a of the brew basket 60. In an embodiment, the shower head includes at least one hole formed therein that defines a fluid outlet. These one or more holes are typically formed in the bottom surface (not shown) of the movable door 152 in any suitable pattern. In an embodiment, the overall dimensions and spacing of the pattern of holes is designed to evenly wet a small volume of flavorant. When the door 152 is in the open position, a fluid flow to the first port 160 may be restricted or blocked. Alternatively, or in addition, when the adapter 80 is coupled to the housing 24, a portion of the adapter 80 may physically block the first port 160 associated with the first brew chamber 34a to prevent fluid flow there through. However, it should be understood that embodiments where the fluid supply line 164 and/or port 160 are located separately from and/or are not in fluid communication with the door 152 are also contemplated herein.

Similarly, a second fluid supply line 166 may be arranged in fluid communication with the second port 162 to deliver fluid to a portion of the adapter 80. In an embodiment, when the adapter 80 is mounted to the housing 24, a fluid inlet 168 (FIG. 9C) extending from the adapter 80 is arranged in fluid communication with the second port 162. In the illustrated, non-limiting embodiment, the second port 162 is arranged near the rear 140 of the adapter housing 82. However, the second port 162 may be at any suitable location relative to the adapter 80. Rotation of the lid 102 to the closed position may cause the fluid inlet 168 or another component operably coupled thereto to sealingly engage the second port 162. In an embodiment, the fluid provided to the adapter via the fluid inlet 168 and second port 162 is received within an interior of the lid 102 and is distributed to the cartridge via the one or more needles 110. However, embodiments where the lid 102 includes one or more openings for distributing the fluid over the flavorant F within the cartridge in a manner similar to a shower head is also within the scope of the disclosure.

Figure 19A:
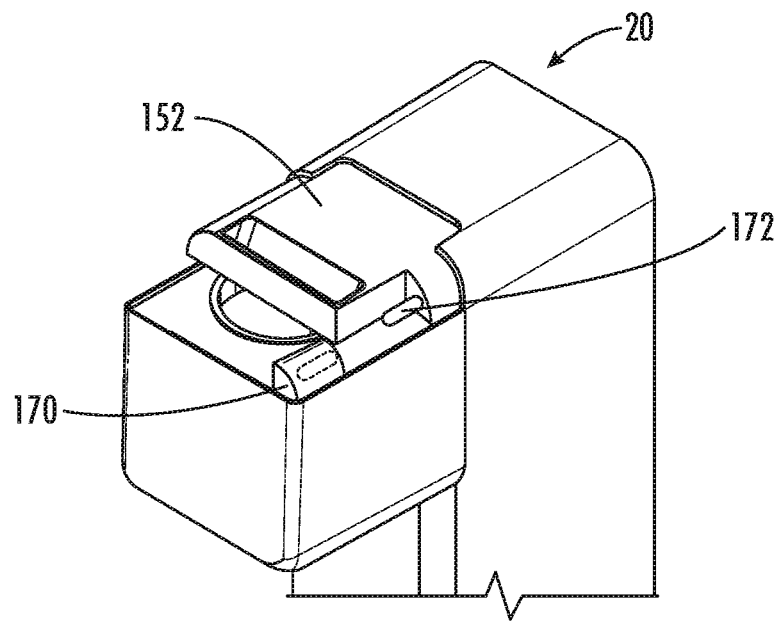
FIG. 19A is a perspective view of a beverage brewing system having a movable door in an open position according to an embodiment.
Figure 19B:
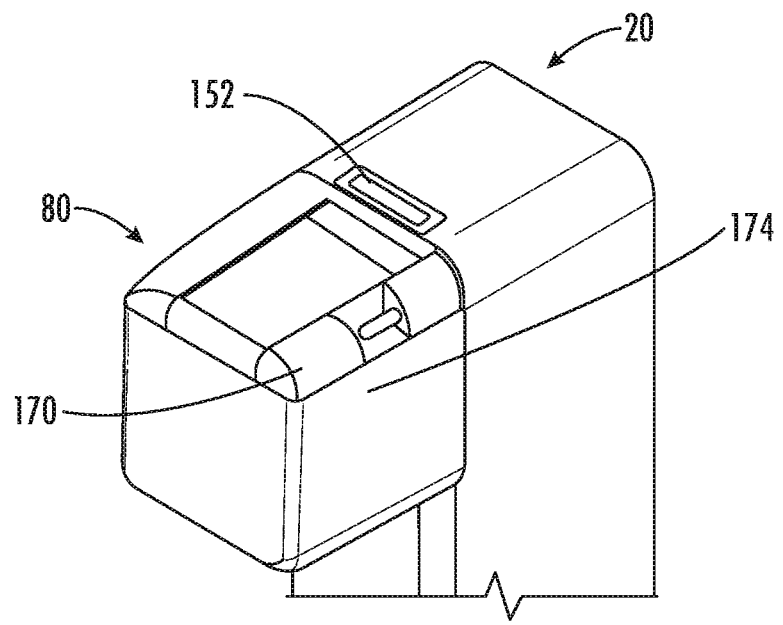
FIG. 19B is a perspective view of the beverage brewing system of FIG. 19A having an adapter connected to the housing according to an embodiment.
Figure 22A:
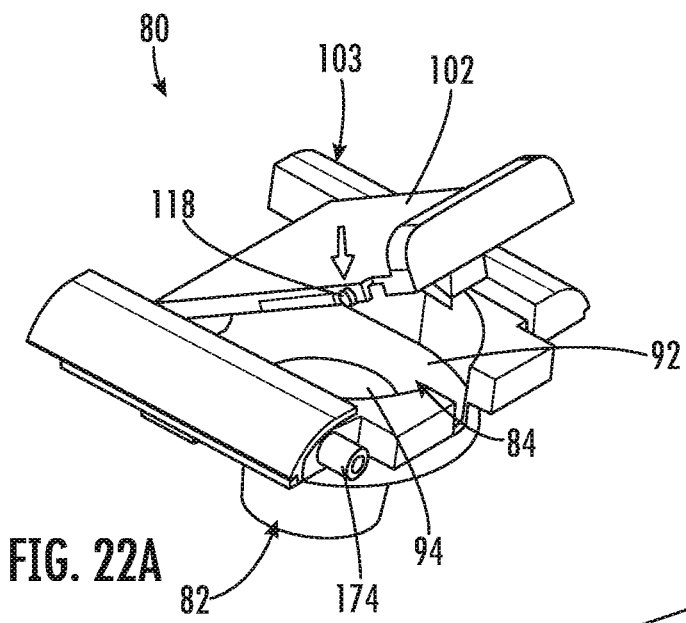
FIG. 22A is a perspective view of an adapter having a lid movable when in the closed position according to an embodiment.
Figure 22B:
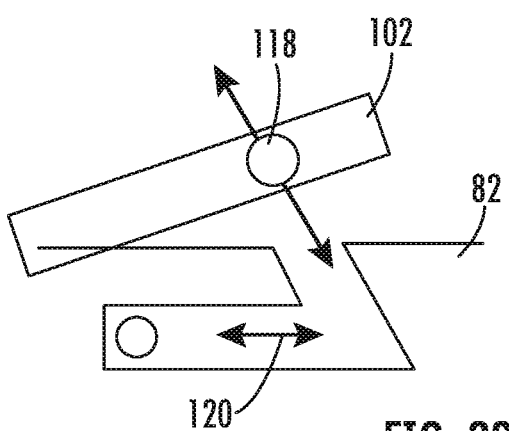
FIG. 22B is a schematic diagram of the engagement between the lid and the housing of the adapter to transform the lid between an unlocked and a locked position according to an embodiment.
Figure 22C:
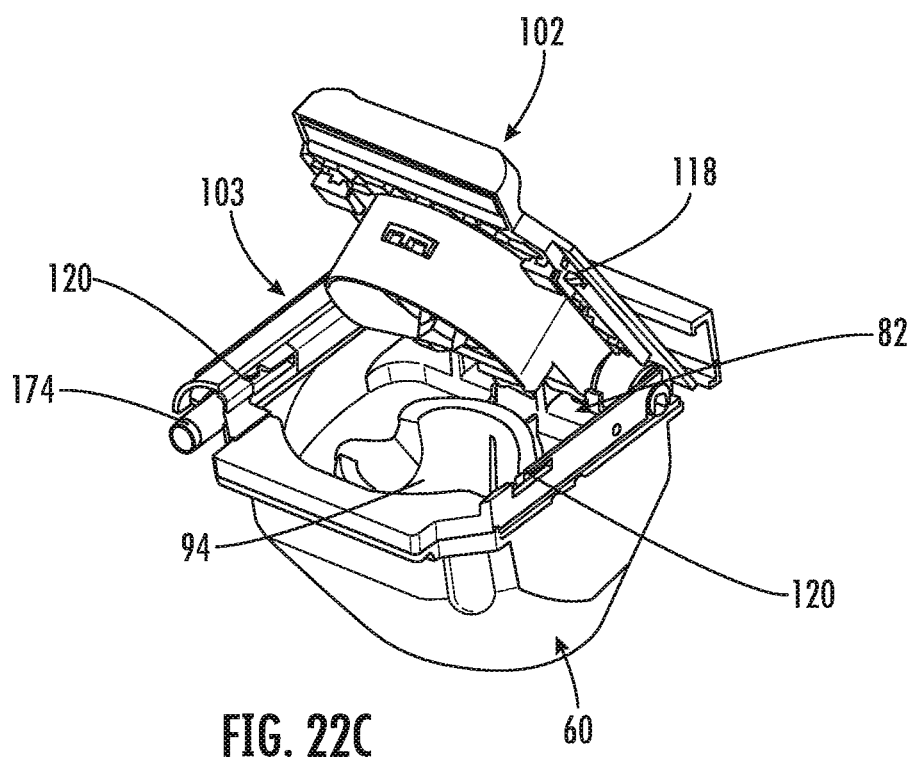
FIG. 22C is a perspective view of an adapter having a lid in an open position according to an embodiment.
Figure 23:
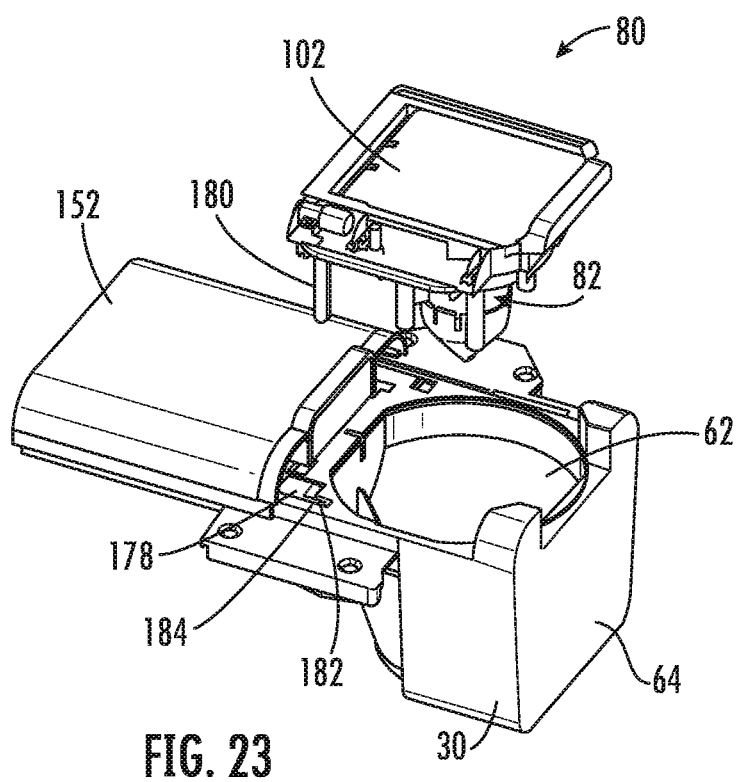
FIG. 23 is a perspective view of a beverage brewing system and an adapter suitable for use with the beverage brewing system according to an embodiment.

With reference now to FIGS. 19A-19B, 23, 24A and 24B, in another embodiment, the fluid delivery system 44 may include a single port 170 configured to cooperate with both the movable door 152 and/or the adapter 80 to deliver fluid to the brew chambers 34a, 34b respectively. In the illustrated, non-limiting embodiment, the port 170 is positioned adjacent to the front of the housing 24, near end 64 of the second support member 30. In embodiments, a first fluid inlet 172 may be mounted to a portion of the movable door 152 (FIG. 19A) configured to engage and seal the port 170, and a second fluid inlet 174 may similarly extend from a portion of the adapter 80 movable to engage and seal the port 170 (FIG. 19B, 22A, 24A). In embodiments where the second fluid inlet 174 extends from the adapter 80, the adapter 80 may include an interlock 176 operable to close or seal the port and/or to move the second fluid inlet 174 out of engagement with the port 170 when the lid 102 is open. However, embodiments where the port 170 is arranged at another location, such as vertically above a sidewall 70 of the brew basket 60 and adjacent the rear of the adapter 80 for example, are also contemplated herein.

In yet another embodiment, the port 170 may be movably mounted within the housing 24. With reference to FIGS., the port 170 is formed within a connector 178 that is rotatable about an axis between a first configuration (FIG. 24A) associated with the first brew chamber 34*a* and a second configuration (FIG. 24B) associated with the second brew chamber 34*b*. The first configuration and the second configuration may be generally orthogonal to one another. In the illustrated, non-limiting embodiment, the connector 178 and port 170 have a generally horizontal orientation when in the first configuration and a generally vertical orientation when in the second configuration. A biasing mechanism (not shown), such as a coil spring for example, may be used to retain the connector 178 in the first configuration. The adapter 80 may include a protrusion 180, such as a post for example, receivable within an opening 182 formed in the housing 24, adjacent the connector 178. As the post 180 is inserted into the opening 182, the post 180 engages and applies a downward force to portion of the connector 178, such as a foot member 184 extending therefrom for example, opposing the biasing force of the biasing mechanism. This downward force causes the connector 178, and therefore the port 170, to rotate within the housing 24, such that the second fluid inlet 174 is receivable within the port 170 as the adapter 80 is mounted to the housing 24. When the adapter 80 is disengaged from the housing 24, the post 180 separates from the foot member 184. In response to removal of the force acting on the foot member 180, the connector 178 and port 170 are biased by the biasing mechanism back to the first configuration.

With reference again to FIGS. 13-16, in addition to delivering fluid to the brew chambers 34*a*, 34*b*, the fluid delivery system 44 may further include another port 190 that functions as a dedicated hot water outlet. In such embodiments, the water provided to the hot water outlet via fluid supply line 192 is not filtered through a flavorant before being delivered to an adjacent container 40. Further, as shown, the hot water outlet or port 190 is located remotely from the receptacle 33, such as at a position laterally offset from the opening 38 associated with the cavity 62.

The fluid supply lines used to deliver fluid from the heating mechanism 48 to the ports of the beverage brewing system 20 may be separate from one another. For example, a first end of each fluid supply line may be coupled to a port, and a second opposite end of each fluid supply line may be separately connected to an outlet of the heating mechanism 48. Alternatively, the fluid supply lines arranged in fluid communication with the one or more ports described herein may be different branches fluidly connected to one another downstream from the heating mechanism 48. In either embodiment, one or more valves (see FIG. 19A) may be used to control a flow of fluid from the heating mechanism 48 to one or more of the fluid ports of the system 20. In such embodiments, the one or more valves 194 are operably coupled to the controller 58 and a position of the at least one valve 194 may be adjusted in response to at least one of an input provided by a user and/or the indicator device configured to detect the presence of the brew basket 60 and/or adapter 80.

Further, as suggested, the controller 58 may be configured to automatically adjust the one or more options selectable via an input of the user interface 54 based on whether the brew basket 60 or the adapter 80 is coupled to the housing 24. Various parameters associated with a brew cycle for preparing any selectable combination of size, brew style, and type of flavorant, associated with both the first format and the second format of flavorant are stored within and/or are accessible by the controller 58. In an embodiment, the parameters for performing each brew cycle are associated with a recommended volume of flavorant. The recommended or suggested volume of flavorant is dependent not only on the size of the beverage being prepared, but also on the type of flavorant being used. However, it should be understood that in some embodiments, the suggested amount of flavorant used to prepare different styles of the same size and type of beverage, i.e. a carafe size of classic coffee and a carafe size of cold brew coffee, may vary.

The stored parameters associated with each brew cycle include, but are not limited to, a water temperature, volume of water, water flow rate, a steep duration, and a total number of infusion cycles. Each brew cycle associated with the preparation of one of the plurality of beverages by the beverage brewing system 20 includes one or more infusion cycles. It should be understood that a brew cycle having any number of infusion cycles is within the scope of the disclosure. The total number of infusion cycles and/or the parameters associated with each infusion cycle, can be adjusted to achieve a desired flavor profile given the format of the flavorant, beverage type, brew size, and brew style.

A beverage brewing system 20 as illustrated and described herein allows is compatible with both a loose flavorant and a prepackaged cartridge of flavorant. Further, the beverage brewing system 20 is better able to achieve an ideal flavor for each combination of type, style, and size of beverage prepared based on the format of the flavorant being used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for preparing a brewed beverage from at least one flavorant, the system comprising:
    a housing;
    a receptacle connectable to said housing for holding the at least one flavorant, said receptacle including a first fluid inlet and a second fluid inlet;
    a reservoir connectable to said housing;
    a first fluid flow path fluidly connecting said reservoir to said first fluid inlet;
    a second fluid flow path fluidly connecting said reservoir to said second fluid inlet; and
    at least one valve in communication with said first fluid flow path and said second fluid flow path, wherein the at least one valve is operable to control a flow to said first fluid flow path and said second fluid flow path in response to a configuration of said receptacle.

2. The system of claim 1, wherein said receptacle has a fluid outlet, both said first fluid inlet and said second fluid inlet being arranged in fluid communication with said fluid outlet.

3. The system of claim 1, wherein said second fluid inlet is vertically offset from said first fluid inlet.

4. The system of claim 1, wherein said receptacle includes a brew basket removably connectable to said housing and a cartridge adapter removably connectable to said housing in overlapping arrangement with said brew basket.

5. The system of claim 4, wherein said first fluid inlet is positioned to deliver fluid to a first brew chamber defined by said brew basket and said second fluid inlet is positioned to deliver said fluid to a second brew chamber defined by said cartridge adapter.

6. The system of claim 5, wherein said first brew chamber is shaped and positioned to receive a loose configuration of the at least one flavorant and said second brew chamber is shaped and positioned to receive a cartridge including the at least one flavorant.

7. The system of claim 6, further comprising a filter positionable within said brew basket to receive said loose configuration of the at least one flavorant.

8. The system of claim 4, wherein when said cartridge adapter is connected to said housing, said first fluid flow path is sealed.

9. The system of claim 8, wherein when said cartridge adapter is connected to said housing, a portion of said cartridge adapter overlaps said first fluid inlet to seal said first fluid inlet.

10. The system of claim 1, further comprising an outlet located remotely from said receptacle and a third fluid flow path fluidly connecting said reservoir to said outlet.

11. A system for preparing a brewed beverage from at least one flavorant, the system comprising:
    a housing;
    a receptacle connectable to said housing for holding the at least one flavorant, said receptacle including a first fluid inlet and a second fluid inlet;
    a reservoir connectable to said housing;
    a first fluid flow path fluidly connecting said reservoir to said first fluid inlet;
    a second fluid flow path fluidly connecting said reservoir to said second fluid inlet, wherein said second fluid inlet is vertically offset from said first fluid inlet.

12. The system of claim 11, wherein said receptacle has a fluid outlet, both said first fluid inlet and said second fluid inlet being arranged in fluid communication with said fluid outlet.

13. The system of claim 11, further comprising at least one valve in communication with said first fluid flow path and said second fluid flow path, wherein said at least one valve is operable to control a flow to said first fluid flow path and said second fluid flow path in response to a configuration of said receptacle.

14. The system of claim 11, wherein said receptacle includes a brew basket removably connectable to said housing and a cartridge adapter removably connectable to said housing in overlapping arrangement with said brew basket.

15. The system of claim 14, wherein said first fluid inlet is positioned to deliver fluid to a first brew chamber defined by said brew basket and said second fluid inlet is positioned to deliver said fluid to a second brew chamber defined by said cartridge adapter.

16. The system of claim 15, wherein said first brew chamber is shaped and positioned to receive a loose configuration of the at least one flavorant and said second brew chamber is shaped and positioned to receive a cartridge including the at least one flavorant.

17. The system of claim 16, further comprising a filter positionable within said brew basket to receive said loose configuration of the at least one flavorant.

18. The system of claim 14, wherein when said cartridge adapter is connected to said housing, said first fluid flow path is sealed.

19. The system of claim 18, wherein when said cartridge adapter is connected to said housing, a portion of said cartridge adapter overlaps said first fluid inlet to seal said first fluid inlet.

20. The system of claim 11, further comprising an outlet located remotely from said receptacle and a third fluid flow path fluidly connecting said reservoir to said outlet.

* * * * *